United States Patent
Lei et al.

(10) Patent No.: US 11,539,494 B2
(45) Date of Patent: Dec. 27, 2022

(54) REFERENCE COORDINATES FOR TWO-STEP RACH RESOURCE CONFIGURATION

(71) Applicant: QUALCOMM Incorporated, San Diego, CA (US)

(72) Inventors: Jing Lei, San Diego, CA (US); Seyong Park, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 10 days.

(21) Appl. No.: 16/855,420

(22) Filed: Apr. 22, 2020

(65) Prior Publication Data

US 2020/0366451 A1 Nov. 19, 2020

Related U.S. Application Data

(60) Provisional application No. 62/847,117, filed on May 13, 2019.

(51) Int. Cl.
  *H04L 5/00* (2006.01)
  *H04W 74/08* (2009.01)
  (Continued)

(52) U.S. Cl.
  CPC .......... *H04L 5/0092* (2013.01); *H04L 5/0051* (2013.01); *H04L 5/0094* (2013.01);
  (Continued)

(58) Field of Classification Search
  CPC ... H04L 5/0092; H04L 5/0094; H04L 5/0051; H04L 5/10; H04W 74/0833; H04W 76/11; H04W 56/0045; H04W 72/0466
  See application file for complete search history.

(56) References Cited

U.S. PATENT DOCUMENTS

2020/0053722 A1\* 2/2020 Choi .................... H04L 5/10
2020/0214044 A1\* 7/2020 Qian ................ H04W 74/0833
(Continued)

OTHER PUBLICATIONS

"5G; NR; Physical Channels and Modulation (3GPP TS 38.211 version 15.5.0 Release 15)", ETSI Technical Specification, European Telecommunications Standards Institute (ETSI), 650, Route Des Lucioles, F-06921 Sophia-Antipolis, France, vol. 3GPP RAN, No. V15.5.0, Apr. 30, 2019 (Apr. 30, 2019), pp. 1-98, XP014345019, Retrieved from the Internet: URL: http://www.etsi.org/deliver/etsi_ts/138200_138299/138211/15.05.00_60/ts_138211v150500p.pdf. [retrieved on Apr. 30, 2019] section 6.3.3.2.
(Continued)

*Primary Examiner* — Chae S Lee
(74) *Attorney, Agent, or Firm* — Procopio, Cory, Hargreaves & Savitch LLP

(57) ABSTRACT

A random access configuration information based on a reference SCS may allow for a unified coordinate system used by the base station and UEs that describes the time-frequency resource configuration for a two-step RACH procedure. The apparatus receives, from a base station, random access configuration information for the base station. The apparatus determines a first time duration for a preamble of a first random access message based on the random access configuration information received from the base station and a reference SCS associated with an uplink BWP configured for the first random access message. The apparatus determines a second time duration for a payload of the first random access message based on the random access configuration information received from the base station and the reference SCS. The apparatus transmits the first message to the base station to initiate a random access procedure.

67 Claims, 16 Drawing Sheets

(51) Int. Cl.
  *H04W 76/11* (2018.01)
  *H04W 56/00* (2009.01)
  *H04W 72/04* (2009.01)
  *H04L 5/10* (2006.01)

(52) U.S. Cl.
  CPC ........... *H04L 5/10* (2013.01); *H04W 56/0045* (2013.01); *H04W 72/0466* (2013.01); *H04W 74/0833* (2013.01); *H04W 76/11* (2018.02)

(56) References Cited

U.S. PATENT DOCUMENTS

2020/0260500 A1* 8/2020 Agiwal ............. H04W 28/0278
2021/0058969 A1* 2/2021 Ahn ..................... H04L 1/0061

OTHER PUBLICATIONS

International Search Report and Written Opinion—PCT/US2020/029604—ISA/EPO—dated Jul. 22, 2020.
LG Electronics: "Discussion on Channel Structure for 2-step RACH", 3GPP Draft, R1-1906717, LG RACH Structure Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), XP051708753, 9 pages, Retrieved from the Internet: URL: http://www.3gpp.org/ftp/tsg%5Fran/WG1%5FRL1/TSGR1%5F97/Docs/R1%2D1906717%2Ezip. [retrieved on May 4, 2019] p. 1 figure 1(b) Option 3; last paragraph.
Qualcomm In Corporated: "Channel Structure for Two-Step RACH", 3GPP TSG-RAN WG 1 Meeting #97, R1-1907255, May 17, 2019 (May 17, 2019), 18 pages, Retrieved from the Internet: URL: http://www.3gpp.org/ftp/tsg%5Fran/WG1%5FRL1/TSGR1%5F97/Docs/R1%2D1907255%2Ezip. [retrieved on May 4, 2019] sections 1-2.

* cited by examiner

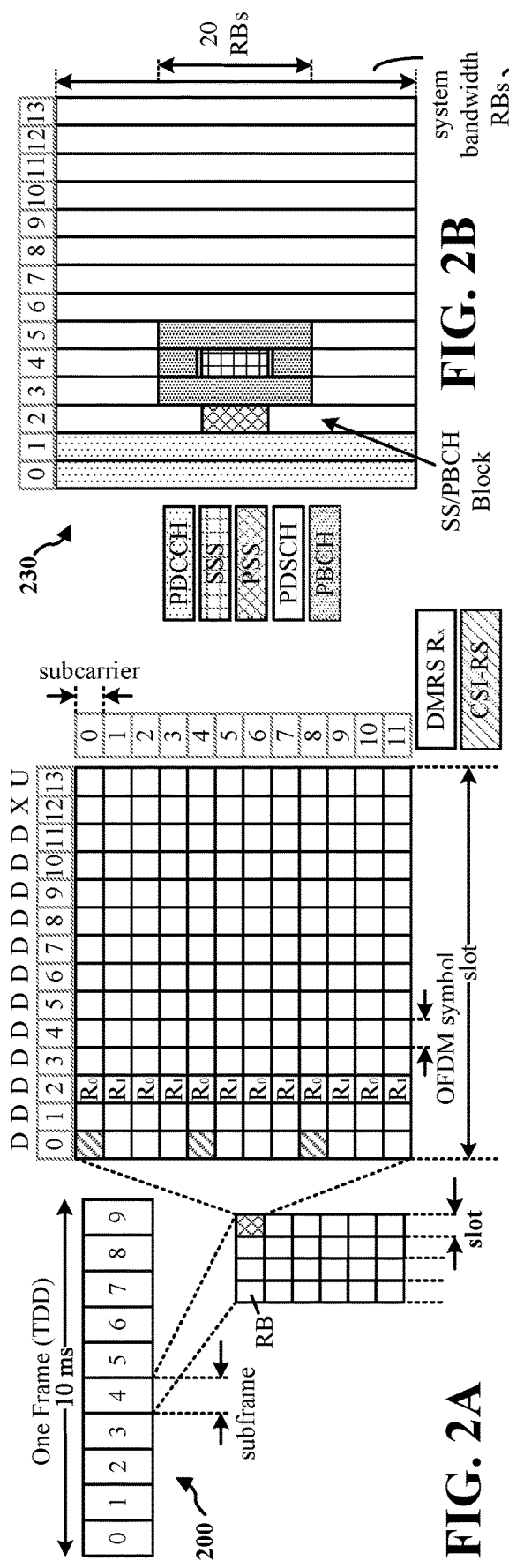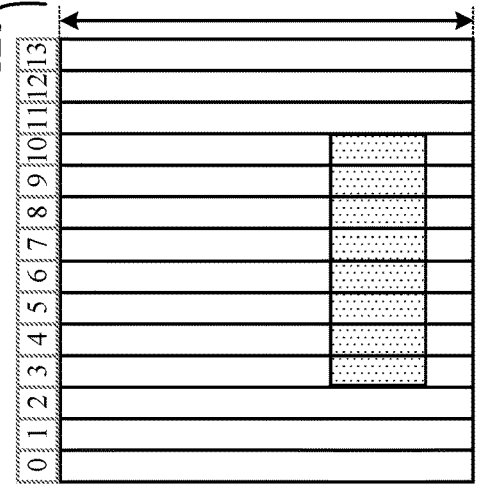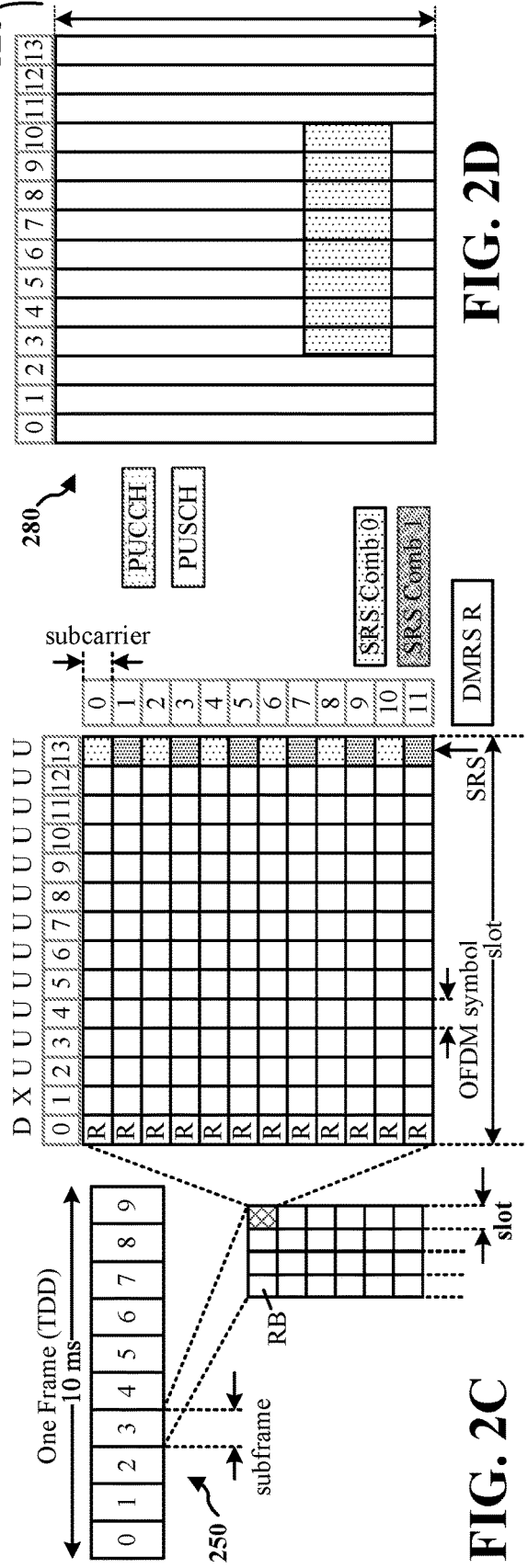
FIG. 2A  FIG. 2B  FIG. 2C  FIG. 2D

REFERENCE COORDINATES FOR TWO-STEP RACH RESOURCE CONFIGURATION

CROSS REFERENCE TO RELATED APPLICATION(S)

This application claims the benefit of U.S. Provisional Application Ser. No. 62/847,117, entitled "Reference Coordinates for Two-Step RACH Resource Configuration" and filed on May 13, 2019, which is expressly incorporated by reference herein in its entirety.

BACKGROUND

Technical Field

The present disclosure relates generally to communication systems, and more particularly, to random access procedures in wireless communications networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A random access or random access channel (RACH) procedure may be performed between a user equipment (UE) and a base station in order for the UE to connect or initialize with the base station. A UE may perform a RACH procedure with the base station under many different conditions, such as, initial access to a cell provided by the base station, during a handover sequence from one cell to another, or re-initialization with the base station to re-synchronize with the base station.

A RACH procedure may include the exchange of messages between a UE and a base station. For example, one type of RACH procedure may include the exchange of four messages between the UE and the base station, and may be referred to as a "four-step RACH procedure." Another type of RACH procedure may include the exchange of two messages between the UE and the base station, and may be referred to as a "two-step RACH procedure."

In a two-step RACH procedure the UE may send an uplink random access message in the form of a preamble portion and a payload portion to the base station to initiate the two-step RACH procedure. The base station processes the message from the UE and based on the processing results of the message from the UE, the base station may transmit a response or downlink message to the UE. However, in some instances the preamble part and the payload part may be transmitted by the UE to the base station using different transmission configurations, such that the base station may have to perform additional or multiple processing steps to process the uplink message from the UE. In addition, the response or downlink message transmitted by the base station to the UE may cause the UE to also perform additional or multiple processing steps to process the downlink message. This may lead to an increase in an implementation complexity and/or increased signaling overhead. Aspects presented herein provide a solution to the problem of increased processing steps performed by the UE and/or the base station to process a message received during a two-step RACH procedure by improving the manner in which a time-frequency resource configuration for messages in a two-step RACH procedure are configured. In some aspects, the time-frequency resource configuration for RACH messages may be optimized by defining a reference coordinate system that is utilized by both the UE and base station to determine the time-frequency resource configuration.

In an aspect of the disclosure, a method, a computer-readable medium, and an apparatus are provided for determining random access messaging based on a reference subcarrier spacing (SCS) for RACH procedures. The apparatus may be a device at a UE. The device may be a processor and/or a modem at a UE or the UE itself. The apparatus receives, from a base station, random access configuration information for the base station. The apparatus determines a first time duration for a preamble of a first random access message based on the random access configuration information received from the base station and a reference SCS associated with an uplink bandwidth part (BWP) configured for the first random access message. The apparatus determines a second time duration for a payload of the first random access message based on the random access configuration information received from the base station and the reference SCS. The apparatus transmits the first random access message to the base station to initiate a random access procedure.

In an aspect of the disclosure, a method, a computer-readable medium, and an apparatus are provided. The apparatus may be a device at a base station. The device may be a processor and/or a modem at a base station or the base station itself. The apparatus transmits random access configuration information for a random access procedure to a user equipment (UE) based on a reference subcarrier spacing (SCS) associated with an uplink bandwidth part (BWP) configured for the first random access message. The apparatus receives a first random access message from the UE to initiate a random access channel (RACH) procedure. The first random access message comprising a preamble and a payload. A first time duration of the preamble and a second time duration of the payload are based on the reference SCS. The apparatus processes the first random access message. The apparatus generates a second random access response message in response to the first random access message. The apparatus transmits the second random access response message to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
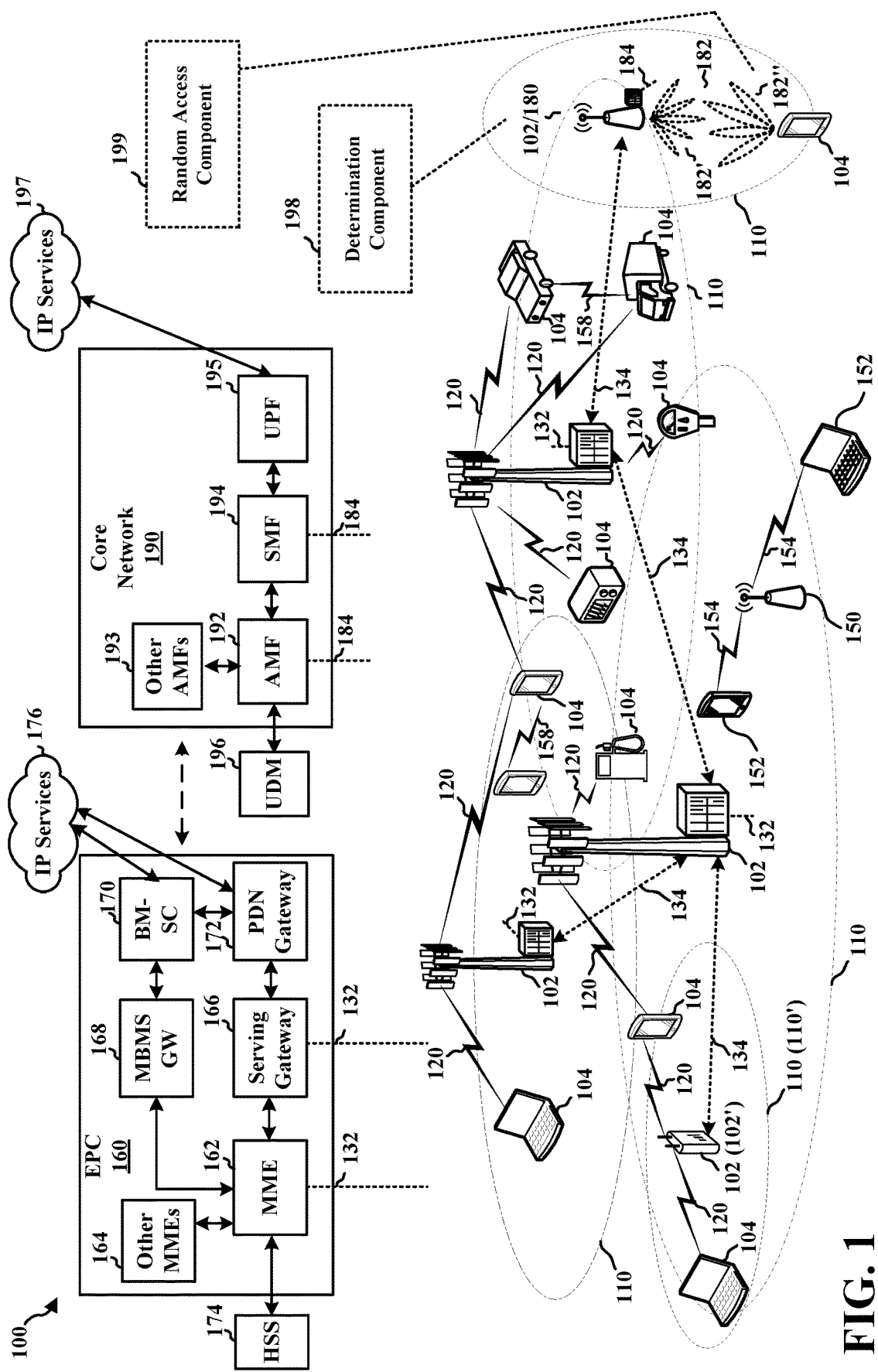
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to utilize a reference coordinate system in the time-frequency grid to reduce signaling overhead in a two-step RACH resource configuration. For example, the UE 104 of FIG. 1 includes a determination component 198 configured to determine a time duration for a preamble of a first random access message based on at least a reference subcarrier spacing (SCS). The UE utilizing the reference SCS in determining the time duration for the preamble allows for a unified coordinate system to describe the time-frequency resource configuration for a two-step RACH procedure.

Referring again to FIG. 1, in certain aspects, the base station 102/180 may be configured to provide a reference coordinate system in the time-frequency grid to reduce signaling overhead in a two-step RACH resource configuration. For example, the base station 102/180 of FIG. 1 includes a random access component 199 configured to transmit random access configuration information. The random access configuration information may be based on a reference SCS to allow for a unified coordinate system that may be used by the base station and UEs to describe the time-frequency resource configuration for a two-step RACH procedure.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
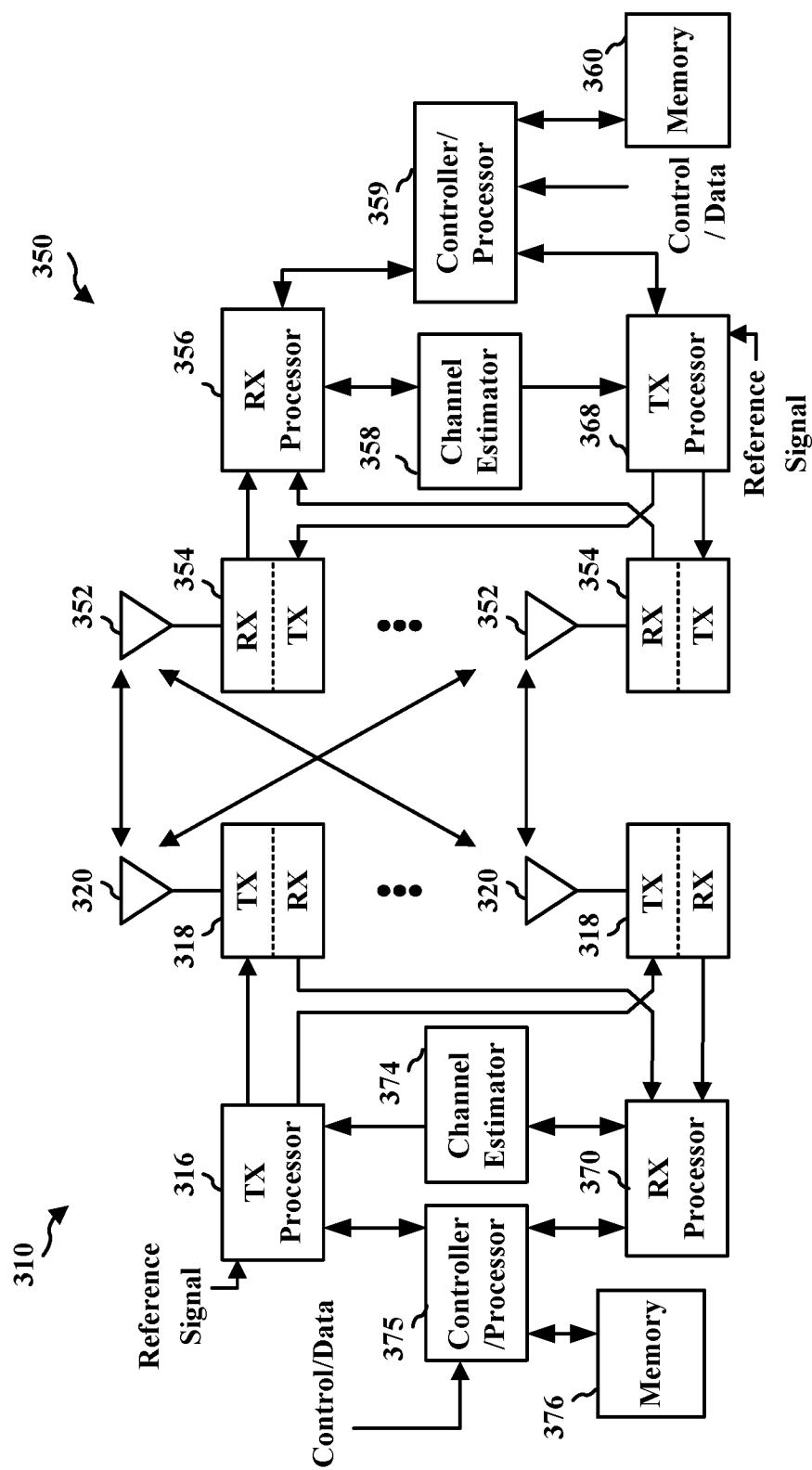
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4B:
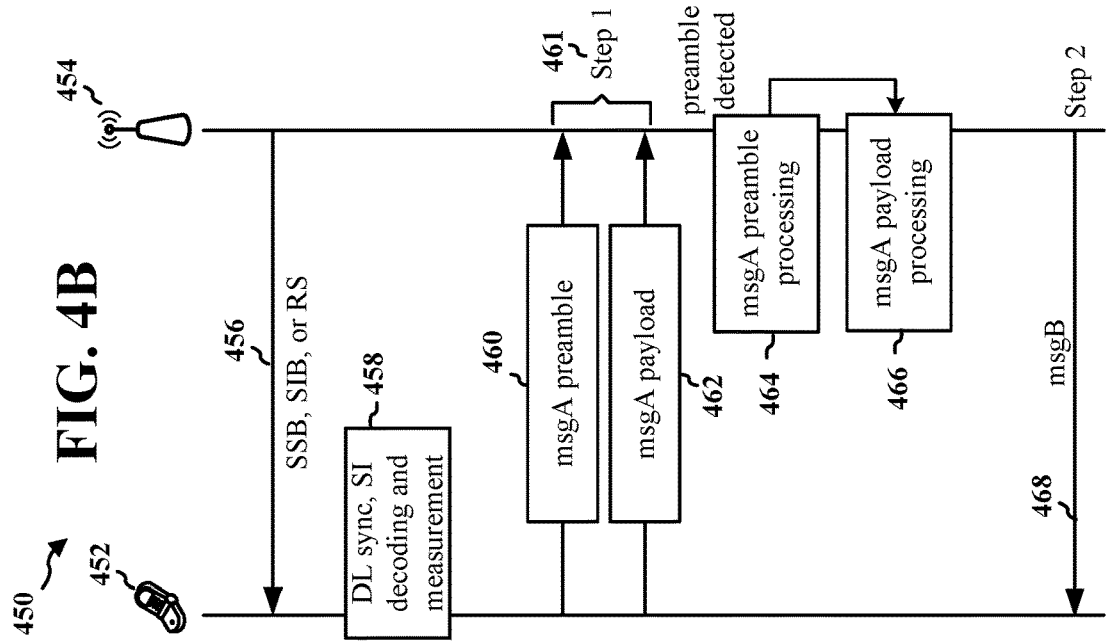
FIG. 4B is an example communication flow for a two-step random access procedure.

A UE may perform the two-step RACH procedure in order to acquire uplink synchronization and/or acquire an uplink grant for a network. FIG. 4B illustrates an example communication flow 450 between a UE 452 and a base station 454 as part of a two-step random access procedure. Prior to the beginning of a two-step RACH process, the UE 452 may receive random access configuration information 456 from the base station 454. For example, the UE 452 may receive an SSB, a SIB, and/or a reference signal broadcast by the base station 454. The UE 452 may process these signals and channels and determine the configuration for the two-step RACH. For example, the UE 452 may determine, at 458, any of a downlink synchronization based on at least one of an SSB, SIB, or reference signal; decoding information, or other measurement information for random access with the base station 454. This configuration for random access may include the messaging channel structure and other related procedures. This configuration information may be carried by the system information (SI). In some aspects, such as when the UE 452 is RRC connected, the configuration information for the two-step RACH procedure may be carried by both the SIB and the SSB. After the UE 452 obtains the configuration information, the UE 452 may generate and transmit a step 1 transmission 461. The step 1 transmission 461 may comprise an uplink transmission from the UE 452 to the base station 454. The Step 1 transmission 461 may be referred to as msgA transmission. The msgA transmission may comprise two parts, the a preamble 460 and a payload 462. The preamble 460 may be transmitted first, followed by the payload 462. The payload 642 may include some MAC-CE, RRC messaging, or data.

When the msgA arrives at the base station 454, the base station 454 will first process the preamble 460, at 464, and then the payload 462, at 464. For example, if the processing of the preamble 460 is successful, the base station 454 may continue to the process the payload 462. The base station 454 may then send a msgB 468 to the UE 452. When the preamble 460 and payload 462 are successfully decoded, the msgB 468 transmitted by the base station 454 to the UE 452, may include contention resolution information. The contention resolution information can comprise or be based on the UE's unique identifier.

Two-step random access may be performed in Frequency Range 1 (FR1) e.g., 450 MHz-6000 MHz and Frequency Range 2 (FR2) (e.g., 24.25 GHz-52.6 GHz) for different cell sizes and different RRC states. For example, it may be helpful for two-step random access to be able to be performed by UEs in an RRC idle state, an RRC inactive state, and an RRC connected state. It may be helpful for two-step random access to be able to be performed for UEs having a valid timing advance (TA) and UEs without a valid TA. The numerologies used in FR1 and FR2 may be different, such that the channel propagation probabilities are also different. Thus, different time-frequency resource allocations may be used for two-step random access. As such, it may be helpful for the two-step random access to be configured to support flexible time-frequency resource allocations and flexible numerology configurations in msgA and msgB channel structure design and procedure design. To accommodate the different propagation environments between FR1 and FR2, as well as to support different cells, there can be a transmission gap between the msgA preamble and payload.

Figure 4A:
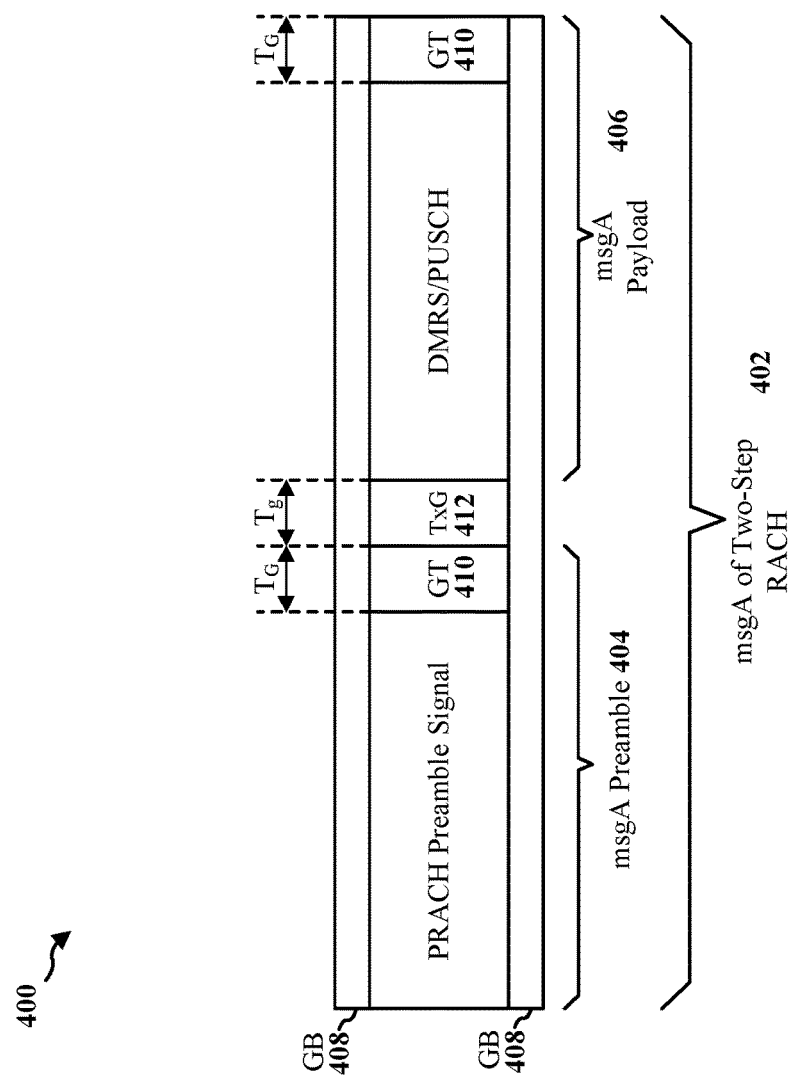
FIG. 4A is a diagram illustrating an example of a msgA channel structure in accordance with certain aspects of the disclosure.

FIG. 4A shows a logical channel structure of a msgA 402. The msgA in diagram 400 includes two parts, the msgA preamble 404 and the msgA payload 406. The msgA 402 further includes guard bands 408. In addition, each of the preamble 404 and payload 406 may comprise a guard time 410 at the transmission end part. Between the preamble 404 and payload 406 is a transmission gap 412 (TxG). The length of the TxG 412 is denoted by Tg. This value of TxG 412 may be configurable. For example, in some aspects, such as for low latency cases, the TxG 412 may be set to zero. While in other aspects, such as when the preamble 404 and payload 406 use different numerologies of different bandwidth parts (BWP), they can have different power control schemes. The inclusion of the TxG 412 can function as a tuning gap between the preamble 404 and the payload 406. The time duration of the preamble, the payload, and the transmission gap may be specified based on a reference SCS, which may be hardcoded or broadcast in system information (SI). For example, different reference SCS may be supported in FR1 and FR2, e.g., the reference SCS in FR1 may be 15 kHz, the reference SCS in FR2 may be 60 kHz or 120 kHz. The actual numerologies used by the preamble and/or payload is broadcast in SI or RRC, which can be different from the reference SCS. When the guard time and guard band are configured for payload transmission, the time duration and bandwidth may also be specified based on the reference SCS. In some aspects, the time duration of the transmission gap and guard time may be N symbols, and the BW of the guard band may be M tones.

A configurable transmission gap between the preamble and payload may be advantageous. For example, the transmission gap may account for instances where the numerology between the preamble and the payload are different. Depending on the deployment scenario, the preamble numerology may utilize a subcarrier spacing of 1.25 kHz, 5 kHz, 15 kHz, or larger. As for the payload, which is mainly DMRS and PUSCH, the subcarrier spacing for the payload side numerology may be multiples of 15 kHz, for example, 15 kHz, 30 kHz, 60 kHz, 120 kHz. In addition, the time frequency resource allocation may differ between the preamble and the payload. The diagram of FIG. 4 provides an example of a logical structure of preamble and payload, such that the preamble and payload are multiplexed together. However, in terms of time-frequency mapping, the preamble and payload may be different. For example, the preamble may occupy multiple slots and the payload may just use a faction slot. In terms of bandwidth, the preamble may occupy, for example, 1 MHz, while the payload may occupy, for example, 5 Hz. Also the BWP configuration for the msgA initial transmission, retransmission, or msgA fallback can be the same or different.

The resource configuration of the msgA and/or msgB may lead to some inefficiencies and/or ambiguities. Such ambiguities, for example, could result in the UE and/or the base station performing multiple and/or additional processing, which can increase the implementation complexity and, in some instances, may lead to false alarms and/or missed detections. Therefore, it may be desirable to have a reference coordinate system which may define some reference SCS or time-frequency structures in the time-frequency grid, such that the base station and UEs may use the reference coordinate system as a unified coordinate system to describe the time-frequency resource configuration. At least one advantage is that the unified coordinate system may reduce signaling overhead, as well as reduce an inefficiencies and/or ambiguities in a two-step RACH procedure. In addition, utilizing the reference SCS may reduce signaling overhead because the UE would not need to perform any calculations based on the actual SCS used instead of the reference SCS.

Figure 5:
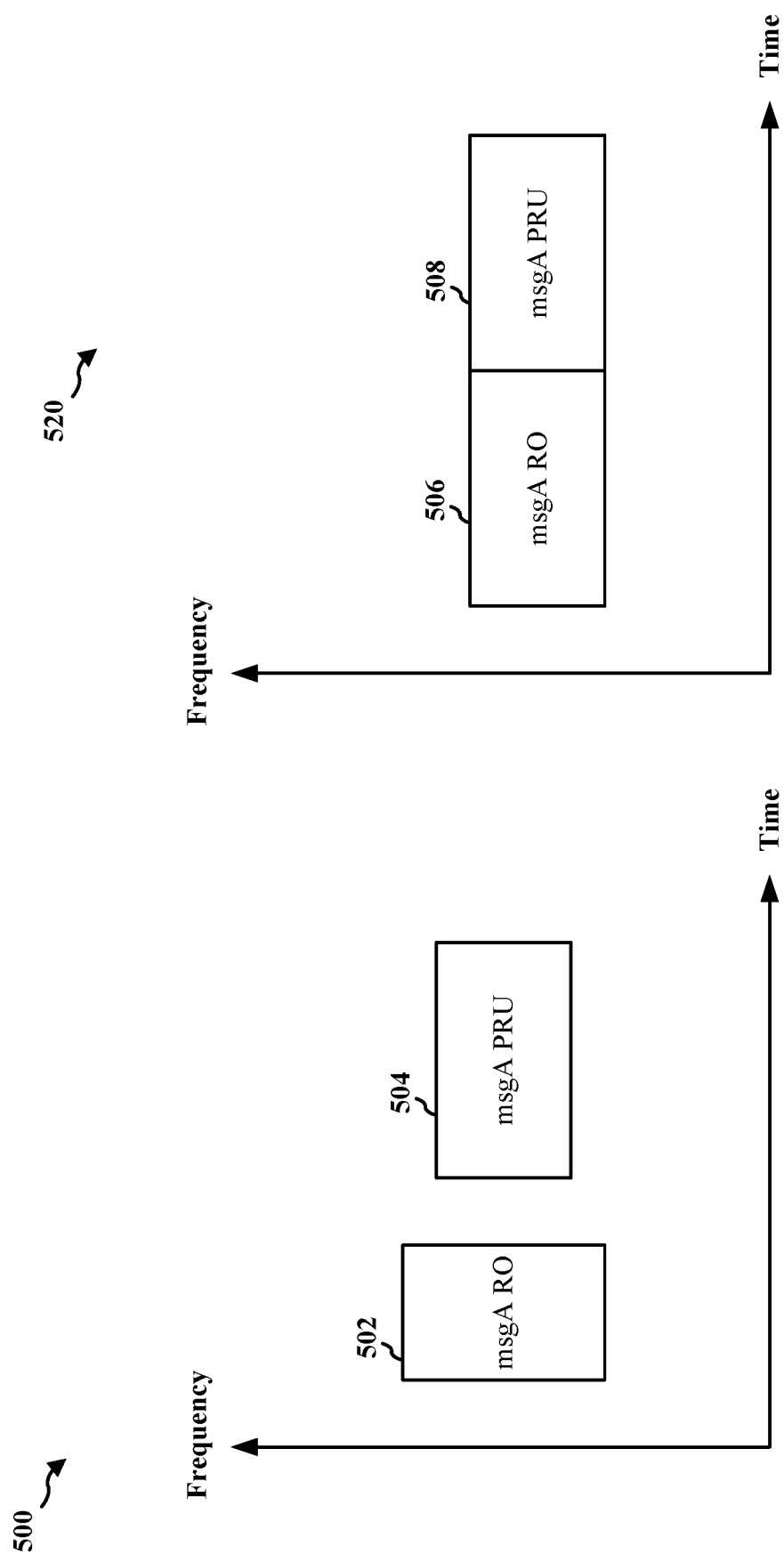
FIG. 5 is a diagram illustrating examples of resource mapping in accordance with certain aspects of the disclosure.

FIG. 5 is a diagram illustrating examples 500, 520 of time-frequency resource mapping. Based on the reference SCS, the UE may know from the base station how to configure the guard bands, guard time, and the transmission gap, as well as how to index its actual transmission time. The UE may be configured to configure different time duration and different bandwidth for the preamble and the payload. If different numerology different numerologies are used, then the description may be too complicated, but if the system utilized a reference SCS, the reference slot structure can be defined as to where and when the msgA (e.g., 502, 504, 506, 508) will be transmitted in the time-frequency domain, and may also be specified in relation to the reference slot index and the reference PRB index. For example, if the network configured the UE such that it transmits at a particular frequency location and at a particular time location, so that if the UE uses a different numerology, then it may be difficult to give a unified description, but if we define some reference SCS and base it on some reference coordinate system, then where and when that UE is transmitted can be specified and related to this reference coordinates, and there won't be ambiguity for the UEs.

Figure 6:
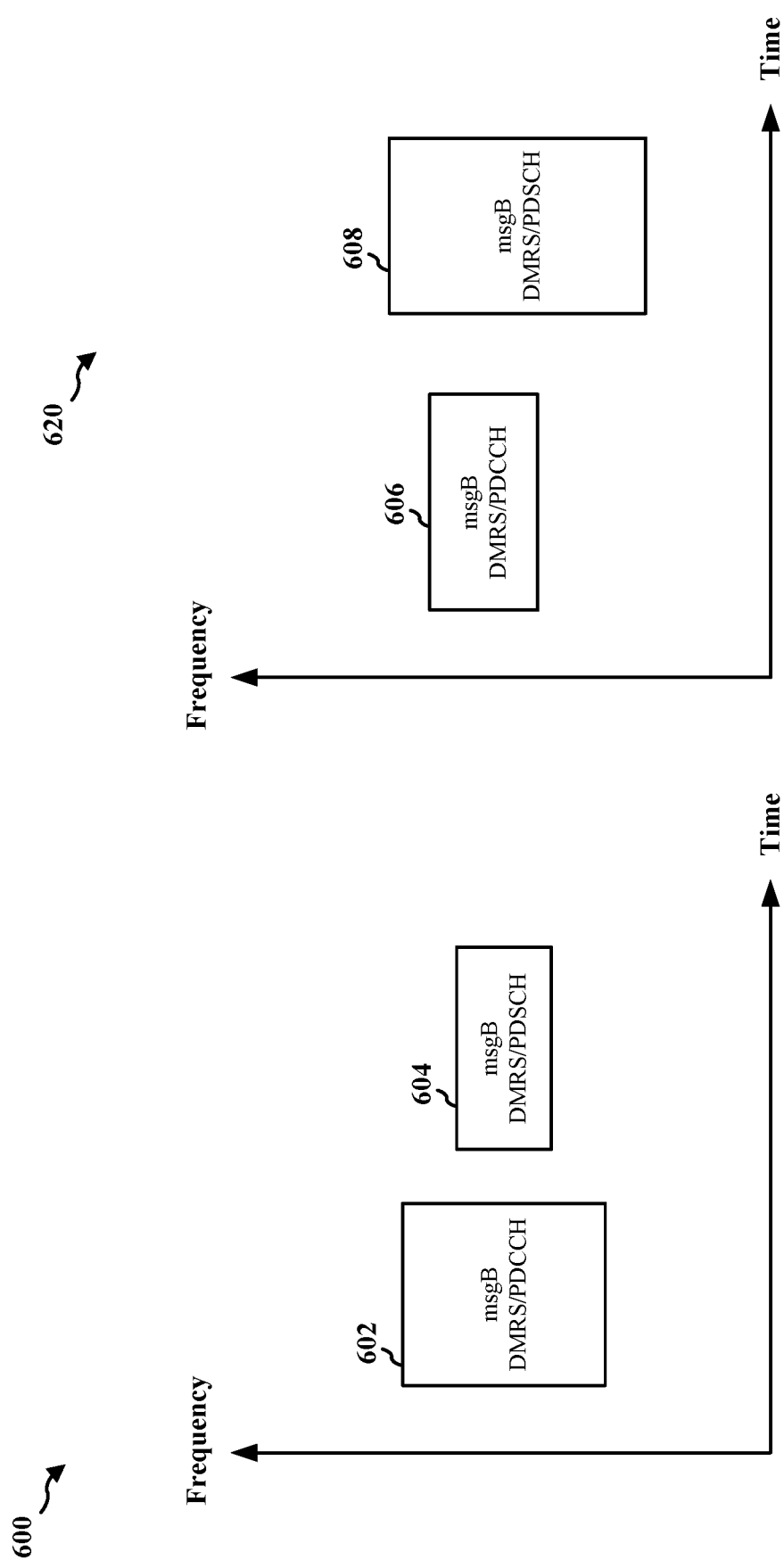
FIG. 6 is a diagram illustrating examples of resource mapping in accordance with certain aspects of the disclosure.

Based on the above, there can be a common reference point in time for slot indexing, which may inform the UE when to transmit its msgA. Specifically, when to transmit its preamble and when to transmit its payload. Those time domain locations are specified with respect to a reference slot index, and that slot index calculation is based on the reference SCS. Similarly, in frequency domain, the base station needs to tell the UE the options they can have as to how to configure the msgA channel structure in the frequency domain. The PRB indexing can also be calculated based on the reference SCS. The reference coordinate system in the time-frequency domain, the time-frequency mapping of msgA and MsgB can be specified without ambiguities. Basically, the frequency domain mapping of the msgA preamble and payload can start and end at the same or different PRB index, and occupy the same or different bandwidth, as shown in the examples 500, 520 of FIG. 5. The time domain mapping for msgA preamble and payload can also start and end at the same or diff slot index, this slot index is a reference slot index and may span a different number of slots. The slots can be an integer number of slots or fractional slot. For msgB, as shown in FIG. 6, which basically includes a PDCCH part (e.g., 602, 606) and a PDSCH part (e.g., 604, 608), they can have different bandwidth and they can have different time duration. By using this reference coordinate sys, when the base station needs to tell the UE, same slot transmission, different slot transmission, same bandwidth, different bandwidth, it is made much easier because the UE and base station, when they refer to the slot index, this PRB index, they can just respect the ref SCS defined.

With reference to FIG. 5, a two-step RACH UE may first select a RO and transmits its preamble on the RO (e.g., 502, 508). After the preamble has been transmitted, the UE may select a PRU and transmit the payload on the PRU (e.g., 504, 508). Depending on the deployment, payload size, and MCS, the time-frequency mapping relationship for the preamble and payload can be quite different.

Figure 7:
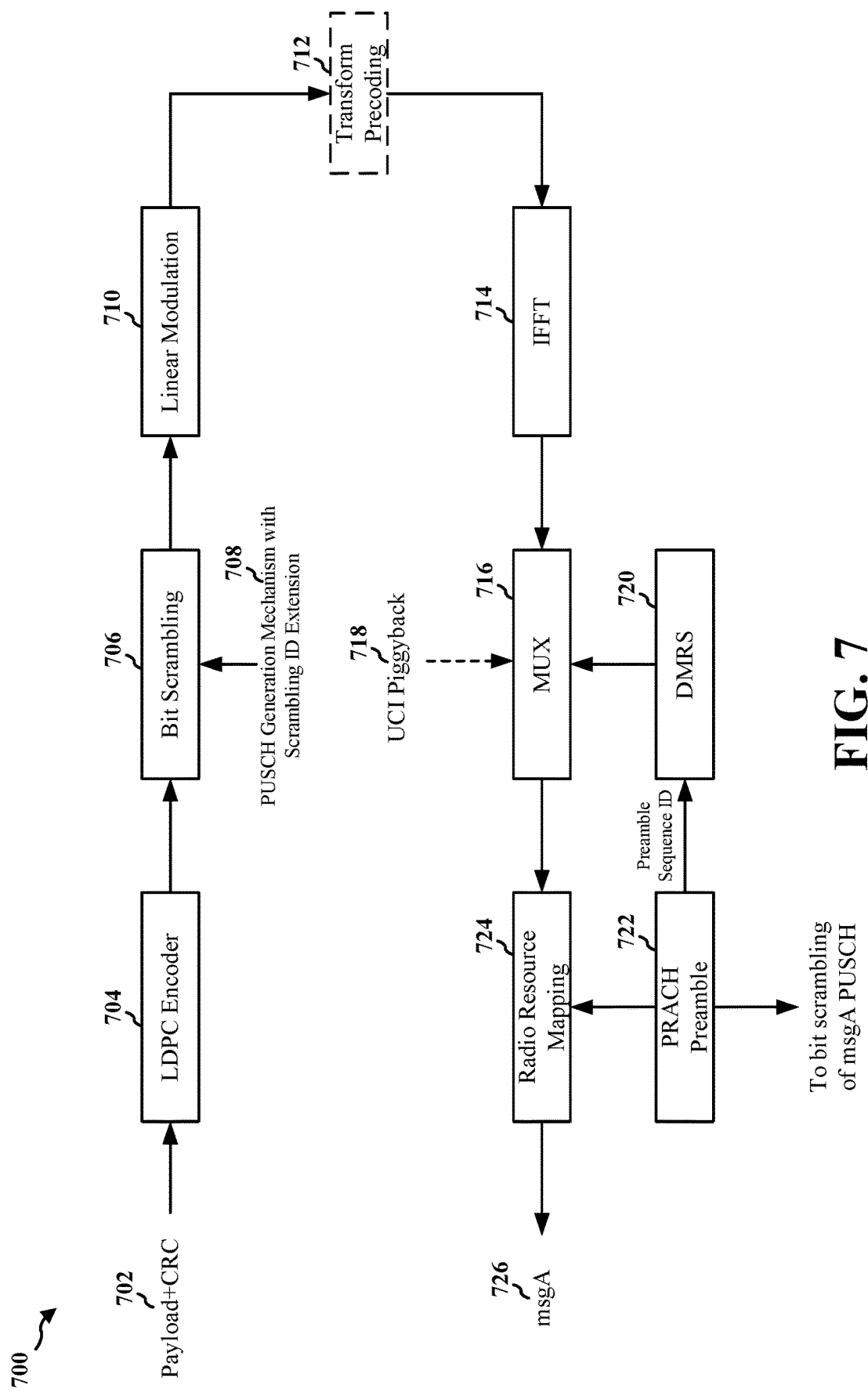
FIG. 7 is a diagram illustrating a transmit chain scheme for random access messages in accordance with certain aspects of the disclosure.
Figure 8:
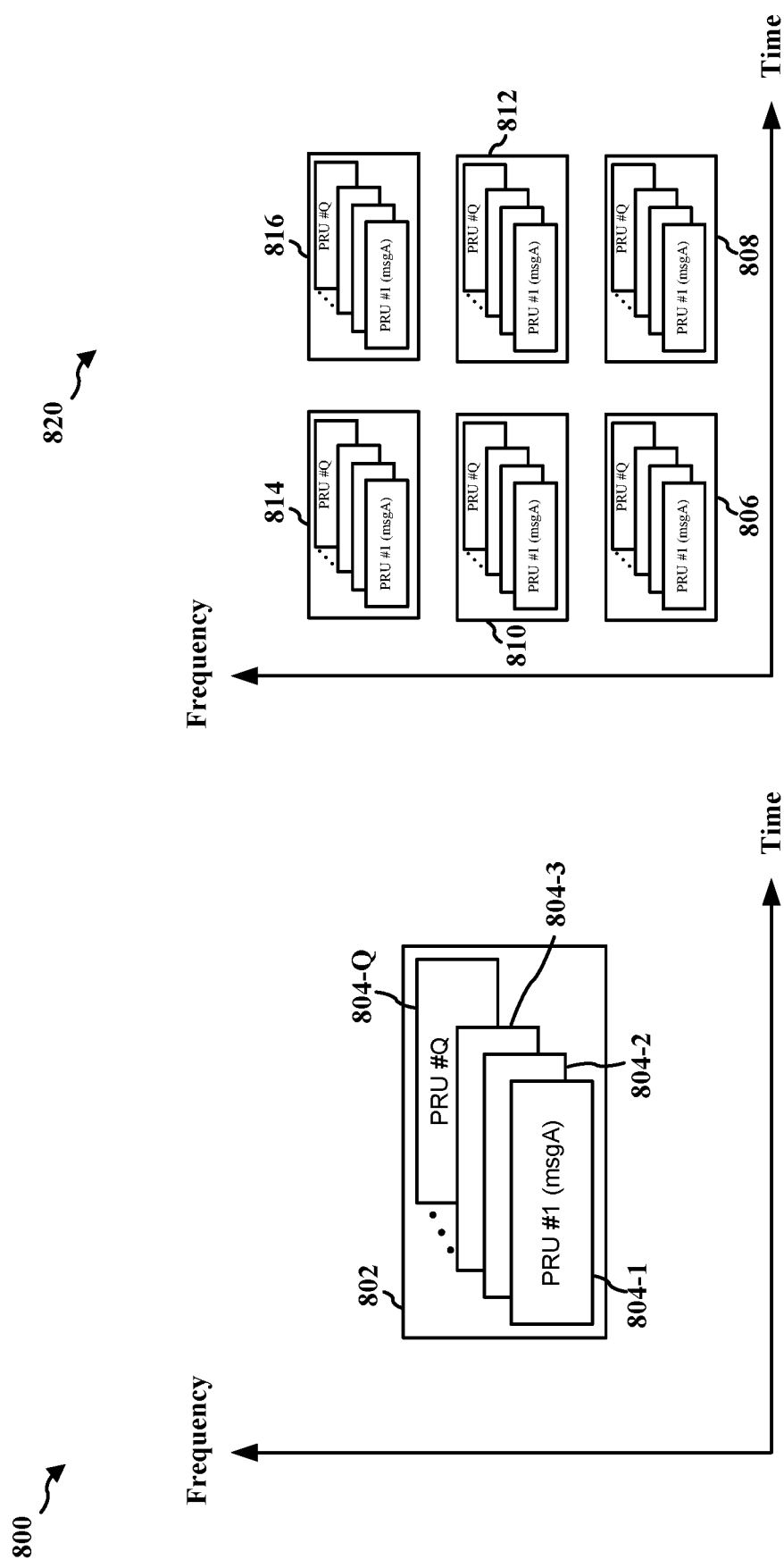
FIG. 8 is a diagram illustrating examples of PRU indexing and PRU grouping in accordance with certain aspects of the disclosure.

FIGS. 7 and 8 are related to the PUSCH resource unit (PRU) indexing and PRU grouping in accordance with certain aspects of the disclosure. In two-step RACH, each PRU may be configured with a DMRS antenna port and a DMRS sequence. The DMRS sequence may be a scrambling ID involved in DMRS sequence generation. In addition to DMRS, the PRU may also include the PUSCH time-frequency resource allocated for the PUSCH transmission.

For a given mapping rule between the preamble and PRU, the scrambling ID of the DMRS sequence generation can use the preamble sequence ID as an input parameter, as shown in FIG. 7. As shown in FIG. 7, the msgA payload may be patched with a CRC at 702. Then, at 704, the payload may be encoded by a low density parity check (LDPC) encoder, which may provide a means to control errors in data transmissions over unreliable or noisy communication channels. After that there will be some bit level scrambling, at 706. Since two-step RACH needs to support UEs in all RRC states, even for UE in RRC idle states, such UEs do not have an established RRC connection with the base station yet, so it doesn't have a valid cell-radio network temporary identifier (c-rnti). In view of this, some changes in the bit scrambling may be needed, because the bit scrambling may be measure by the c-rnti, and that only works for RRC connected UEs. Only RRC connected UEs are permitted in a four-step RACH, but now we want to configure a two-step RACH. That means that the UE needs to transmit data the PUSCH payload part before it could obtain a valid c-rnti. In order to make the bit scrambling work and in order for the RRC idle UEs and inactive UEs to be recognized by the base station, a scrambling ID may be needed in the bit scrambling After the scrambling 706, there is linear modulation 710, and if there is any waveform, there will be transform precoding 712, the transform precoding can be skipped in some instances. After that there will be IFFT 714 and then there will be some multiplexing with DMRS 720 and UCI 718. Since the msgA preamble and payload are transmitted together, after the UE selects the preamble, the DMRS will not be independent. As such, there should be some association between the preamble sequence and DMRS sequence. This is because the base station will process the preamble and will use the results of processing the preamble to process the DMRS and PUSCH. If the preamble sequence and DMRS sequence are configured or generated independently, then the processing results of the preamble may not be helpful to perform the payload processing. Thus, there may be an association or mapping rule between the preamble and DMRS. Because of that these two may be correlated. After the preamble is detected, the preamble may provide sizing information for the base station to process this payload and to do the channel estimation for the UE. Due to the correlation, to generate the DMRS sequence the DMRS may use the preamble sequence index as input parameter, and this naturally is an association between the msgA preamble and the msgA payload.

For the PRU to have an index, the PRU may have a code domain index. The PRU may also have another group index. Each PRU may be configured with a DMRS antenna port and a DMRS sequence (e.g., scrambling ID), and a PUSCH time-frequency resource. For a given mapping rule between the preamble and PRU, the DMRS scrambling ID can use the preamble sequence index as an input parameter. Thus, the indexing of PRU can be done in the code domain first, based on the preamble sequence index or DMRS resource index. For example, the code index for the PRU may be defined using the following equation:

CodeIndex_PRU=K1*Index_DMRS_Port+
K2*Index_DMRS_ScramblingID+
K3*Index_Preamble

In the above equation, K1, K2, and K3 may be equal to or greater than zero, and are scaling integers. As shown in the formula, the preamble index becomes a parameter in generating or calculating the code index of the PRU. K1, K2, K3 are scaling integers and should be constants once the mapping rule is fixed. K1, K2, K3 and the formula can be signaled from the base station to the UE in the system info as well.

For multiple PRU, one PRU is one DMRS antenna port, DMRS sequence, and PUSCH time-frequency resource, but multiple PRUs can be multiplexed in the code domain, time domain, and frequency domain, which can translate to CDMA, TDMA, and FDMA, respectively. For multiple PRUs, which are multiplexed in the code domain the code index formula may be utilized. But multiple PRUs may be specified in the time-frequency domain, and a group index may be provided to that PRU as well. This means that across the time-frequency domain, each PRU may be specified by a 2-dimensional array. The first element of the array may be the group index, so that group index can follow a frequency domain first sorting, followed by time domain sorting, or the vice-versa. In some instances, the time domain sorting may be first, followed by frequency domain sorting. The 2-dimensional array identifies the PRU to be used by the UE for msgA transmission. The disclosure introduces a way to specify the PRU that is associated with a particular preamble and describes how the preamble resources and how the payload resources may be mapped and how this mapping relationship may be established based on the reference coordinate system.

FIG. 8 provides an example of the PRU indexing and the PRU grouping. With respect to FIG. 8, the example 800 shows an example of multiple PRUs (e.g., 804-1-804-Q) sharing a payload occasion (PO), wherein the PRUs may be ordered by code index within a PRU group (e.g., 802). The example 820 shows multiple PRU groups (e.g., 806-816)

that may be configured in the time-frequency domain. The indexing of the PRU groups can follow any order disclosed herein. Each PRU may be identified my a 2-dimensional array, for example, based on a PRU Group Index, and by a PRU Code Index.

Figure 9A:
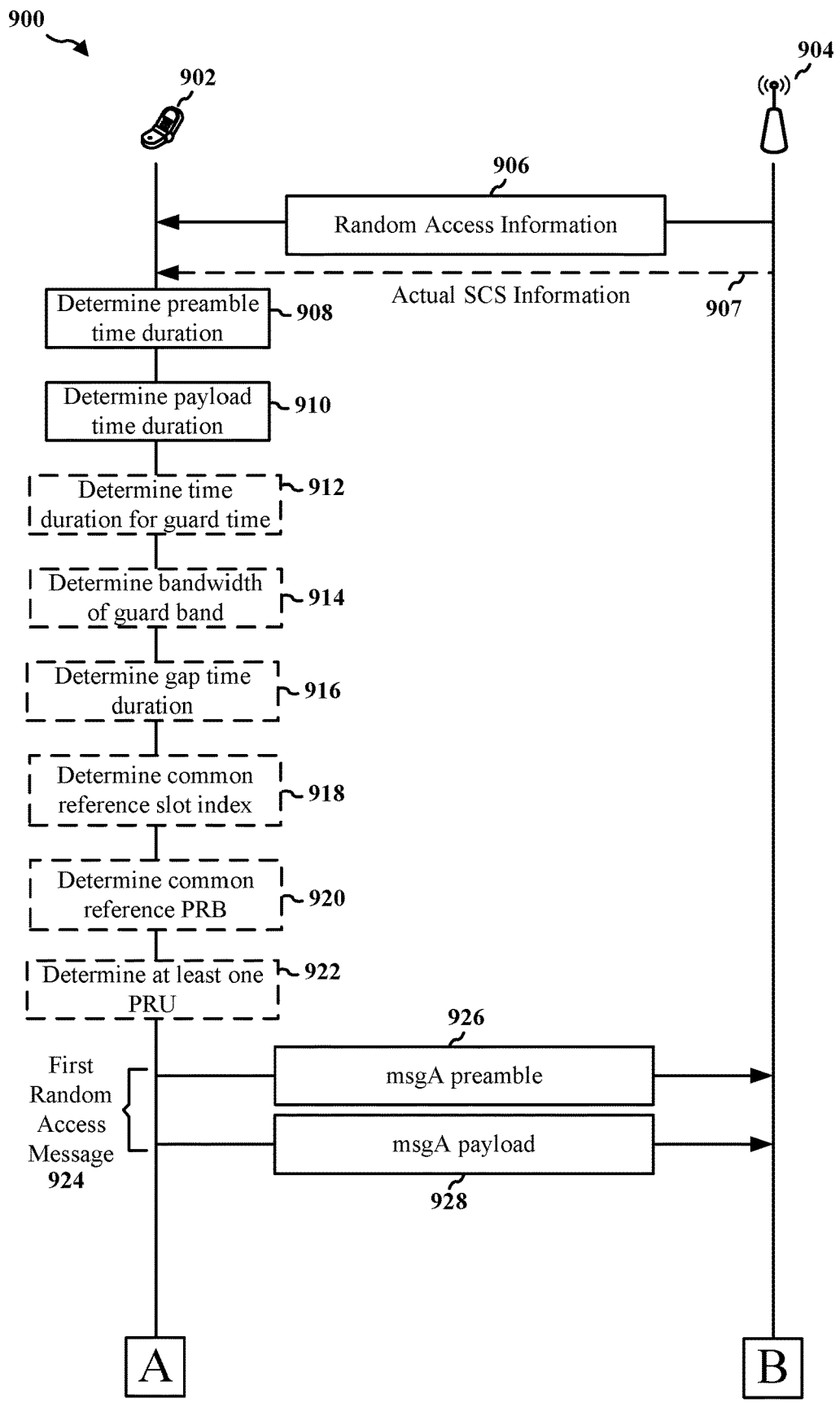
FIGS. 9A-9B are a call flow diagram illustrating an example of a two-step RACH procedure in accordance with certain aspects of the disclosure.
Figure 9B:
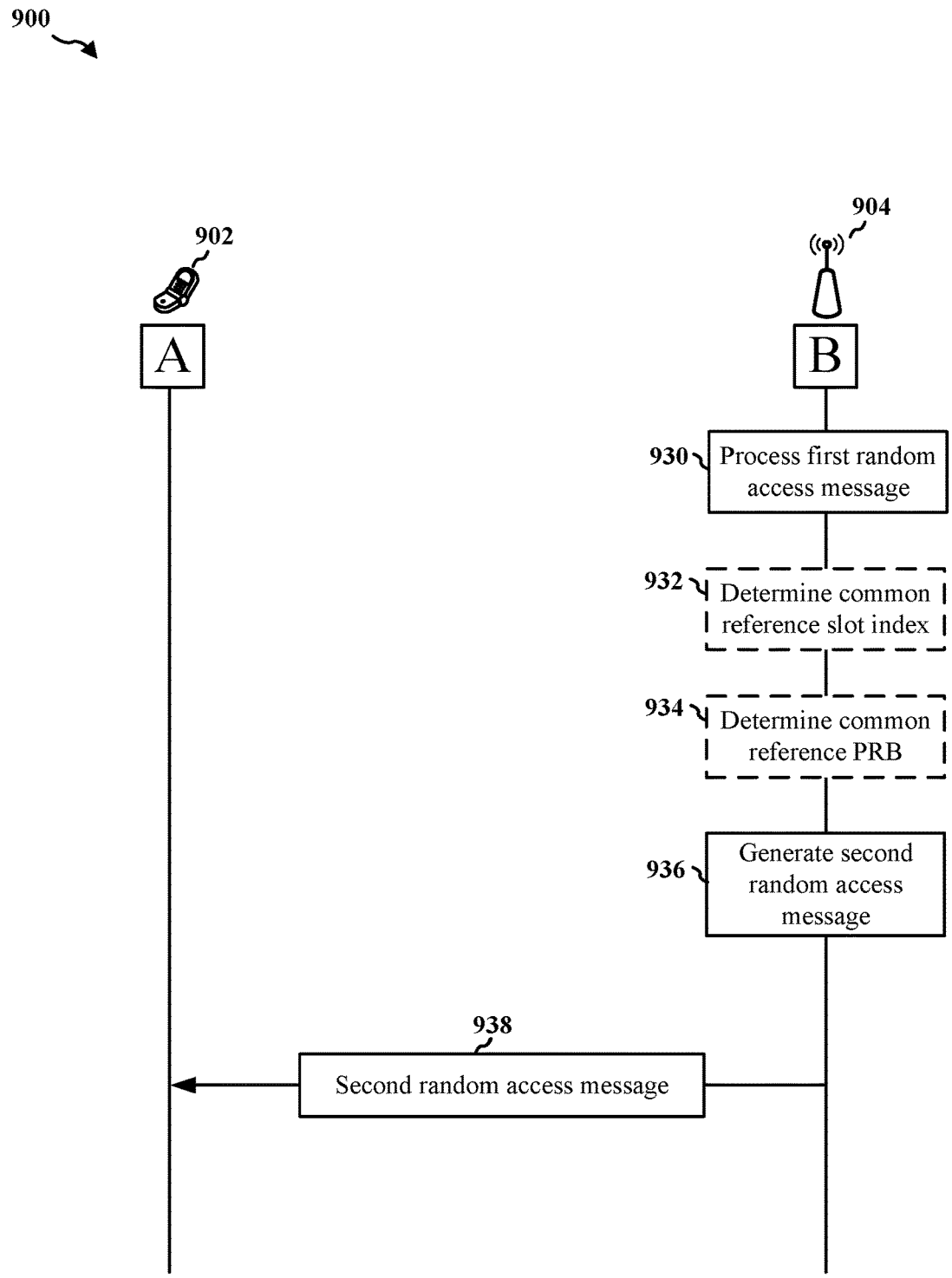

FIGS. 9A-9B illustrate a call flow diagram 900 of signaling between a UE and a base station in a two-step RACH procedure in accordance with certain aspects of the disclosure. The diagram 900 of FIGS. 9A-9B include a UE 902 and a base station 904. The base station 904 may be configured to provide a cell. For example, in the context of FIG. 1, the base station 904 may correspond to base station 102/180 and, accordingly, the cell may include a geographic coverage area 110 in which communication coverage is provided and/or small cell 102' having a coverage area 110'. Further, a UE 902 may correspond to at least UE 104. In another example, in the context of FIG. 3, the base station 904 may correspond to the base station 310 and the UE 902 may correspond to UE 350. Optional aspects are illustrated with a dashed line.

The UE 902 may perform the two-step RACH procedure in order to acquire uplink synchronization, acquire an uplink grant for a network, and/or to transmit a payload to a network. In various configurations, the UE 902 may indicate an identity or ID of the UE 504 through the two-step RACH procedure and, further, the base station 904 may acknowledge the ID of the UE 902 through the two-step RACH procedure.

Prior to the commencement of the two-step RACH procedure, the UE may receive, from the base station, random access configuration information (e.g., 906) for the base station. The random access configuration information transmitted by the base station may be in the form of a downlink reference signal (RS) and/or a physical channel such as synchronization signal block (SSB) or system information block (SIB). The UE may receive and process the random access configuration information in order to determine the configuration of the two-step RACH. The random access configuration information (e.g., SSB, SIB, and RS) may include RACH process configuration parameters, such as, the channel structure of msgA and msgB for the two-step RACH process, the associated procedures, and the related thresholds. In some aspects, the random access configuration information may be based on a reference subcarrier spacing (SCS) that may be utilized as a reference to identify the time-frequency resource configuration for the messages in the two-step RACH procedure. The SCS may be predefined and known by both the UE 902 and the base station 904. The reference SCS may be associated with an uplink BWP configured for a first random access message. In some aspects, the base station may transmit information about a reference SCS, e.g., which may be reference to as an actual SCS, 907. Both the UE (e.g., 902) and the base station (e.g., 904) may be configured to utilize the reference SCS as a reference coordinate system that describes the time-frequency resource configuration.

A two-step RACH procedure may include the exchange of two messages between the UE 902 and the base station 904. The UE 904 may initiate the two-step RACH procedure with a first random access message (e.g., 402, 924), which may be referred to as msgA. The msgA may include a preamble (e.g., 404, 926) and a payload (e.g., 406, 928). The base station 904 may complete the two-step RACH procedure with a second random access message (e.g., 938), which may be referred to as msgB.

After receiving and processing the random access configuration information, the UE may generate the preamble. The UE may determine the preamble based on the configuration information indicated in the random access configuration information. The UE, at 908, may be configured to determine a first time duration for the preamble (e.g., 404, 926) of the first random access message (e.g., 402, 924) based on the random access configuration information received from the base station (e.g., 904) on one or multiple carrier frequencies and the reference SCS associated with an uplink BWP configured for the first random access message.

The UE may also generate the payload for the first random access message. For example, at 910, the UE may be configured to determine a second time duration for the payload (e.g., 406, 928) of the first random access message based on the random access configuration information received from the base station on one or multiple carrier frequencies and the reference SCS.

In some aspects, the UE, at 912, may be configured to determine a third time duration for a guard time (e.g., 410) between the preamble (e.g., 404, 926) and the payload (e.g., 406, 928) of the first random access message. In some aspects, the third time duration of the guard time may be determined based on the random access configuration information (e.g., 906) from the base station and the reference SCS. In some aspects, at least one of the preamble or the payload may comprise the guard time 410. However, in some aspects, each of the preamble and the payload may comprise a guard time 410. In yet some aspects, the time duration of the guard time associated with the preamble may be same or different as the time duration of the guard time associated with the payload.

In some aspects, the UE at 914, may be configured to determine a bandwidth of a guard band (e.g., 408) and a duration of a guard period for the first random access message based on the random access configuration information received from the base station and the reference SCS. In some aspects, at least one of the preamble or the payload may be transmitted using the guard band.

In some aspects, the UE at 916, may be configured to determine a gap time duration for a transmission gap (e.g., 412) between the preamble and payload based on the random access configuration information received from the base station and the referenced SCS. The transmission gap may be a duration of time between the end of transmission of the preamble and the beginning of the transmission of the payload. The duration of the transmission gap may be configurable. For example, in low latency cases, the transmission gap may be set to zero. However, in some aspects, such as when the preamble and the payload use different numerology or different bandwidth part (BWP), the preamble and payload will have different power control schemes. As such, in order for the UE to facilitate or simplify the UE transmission, a transmission gap may be introduced. The transmission gap may function as a tuning gap between the preamble and the payload. In addition, the transmission gap may also provide some advantages to the base station. For example, in two-step RACH, the base station processes the preamble first, and after the base station detects and processes the preamble, the base station will use the information derived from the processing to process the payload. The transmission gap also provides a gap in time which may simplify the base station processing.

In some aspects, the UE at 918, may be configured to determine a common reference slot index for the first random access message based on the reference SCS associated with an active uplink BWP configured for the first random access message. In some aspects, a time domain mapping of the first random access message on one or multiple carrier frequencies may be based on the common reference slot index.

In some aspects, the UE at 920, may be configured to determine a common reference physical resource block (PRB) for the first random access message for one or multiple carrier frequencies based on the reference SCS. In some aspects, a frequency domain mapping of the first random access message on one or multiple carrier frequencies may be based on the common reference PRB. In yet some aspects, the transmission of the first random access message may be based on at least one of the common reference slot index or the common reference PRB.

In some aspects, the UE at 922, may be configured to determine at least one physical uplink shared channel (PUSCH) resource unit for the payload. The PUSCH resource unit (PRU) may be associated with a demodulated reference signal (DMRS) antenna port and a DMRS scrambling identifier (ID). The DMRS scrambling ID may be based at least on a preamble sequence index of the preamble. In some aspects, the at least one PRU may comprise a code domain index. The code domain index may be based at least on the DMRS antenna port, the DMRS scrambling ID, and the preamble sequence index.

The UE may be configured to transmit the first random access message 924 to the base station. The first random access message 924 may include the preamble 926 and the payload 928. The UE may transmit the first random access message to the base station on one or multiple carrier frequencies to initiate the random access procedure.

The base station 904 may receive the first random access message from the UE on one or multiple carrier frequencies to initiate the RACH procedure. In some aspects, the first random access message may comprise the preamble and the payload, where a first time duration of the preamble and a second time duration of the payload may be based on the reference SCS.

The base station, at 930, may be configured to process the first random access message. As discussed above, the preamble is processed first and then the payload. If the preamble is properly received and decoded, the base station may detect and process the payload. In some aspects, the base station may be configured to process the first random access message using a DMRS scrambling ID based on a preamble sequence index of the preamble.

The base station, at 936, may generate a second random access response message in response to the first random access message. In some aspects, the second random access response message may comprise at least one of a timing advance indication or an uplink grant indication on one or multiple carrier frequencies. At least one of the timing advance indication or the uplink grant indication on one or multiple carrier frequencies may be based on the reference SCS. In some aspects, both the timing advance indication and the uplink grant indication may be based on the reference SCS. However, in some aspects, at least one of the timing advance indication or the uplink grant indication on one or multiple carrier frequencies may be based on an actual SCS (e.g., 907) used in the transmission of the payload comprised in the first random access message. In yet some aspects, the timing advance indication and the uplink grant indication may be based on the actual SCS used in the transmission of the payload comprised in the first random access message. In some aspects, at least one of the timing advance indication or the uplink grant indication on one or multiple carrier frequencies may be based on a network configuration for an initial uplink BWP. In some aspects, at least one of the timing advance indication or the uplink grant indication on one or multiple carrier frequencies may be based on an active uplink BWP.

In some aspects, the base station, at 932, may be configured to determine a common reference slot index for the second random access response message based on a reference SCS associated with the RACH procedure capability of the UE. In some aspects, a time domain mapping of the second random access response message may be based on the common reference slot index.

In some aspects, the base station, at 934, may be configured to determine a common reference PRB for the second random access response message based on the reference SCS. In some aspects, a frequency domain mapping of the second random access response message may be based on the common reference PRB. In some aspects, the transmission of the second random access response message on one or multiple carrier frequencies may be based on at least one of the common reference slot index or the common reference PRB.

In some aspects, the second random access response message may be configured to trigger retransmission of the first random access message. For example, when the base station does not properly decode the preamble and/or the payload. In some aspects, the preamble detection and/or payload processing may be unsuccessful. In such instances, the base station is unable to successfully decode or process the preamble, as a consequence the base station may be unable to successfully perform the payload processing. Unsuccessful preamble decoding and/or unsuccessful payload processing may cause the two-step RACH procedure to fail and, therefore, the UE may reattempt the two-step RACH procedure.

Figure 10:
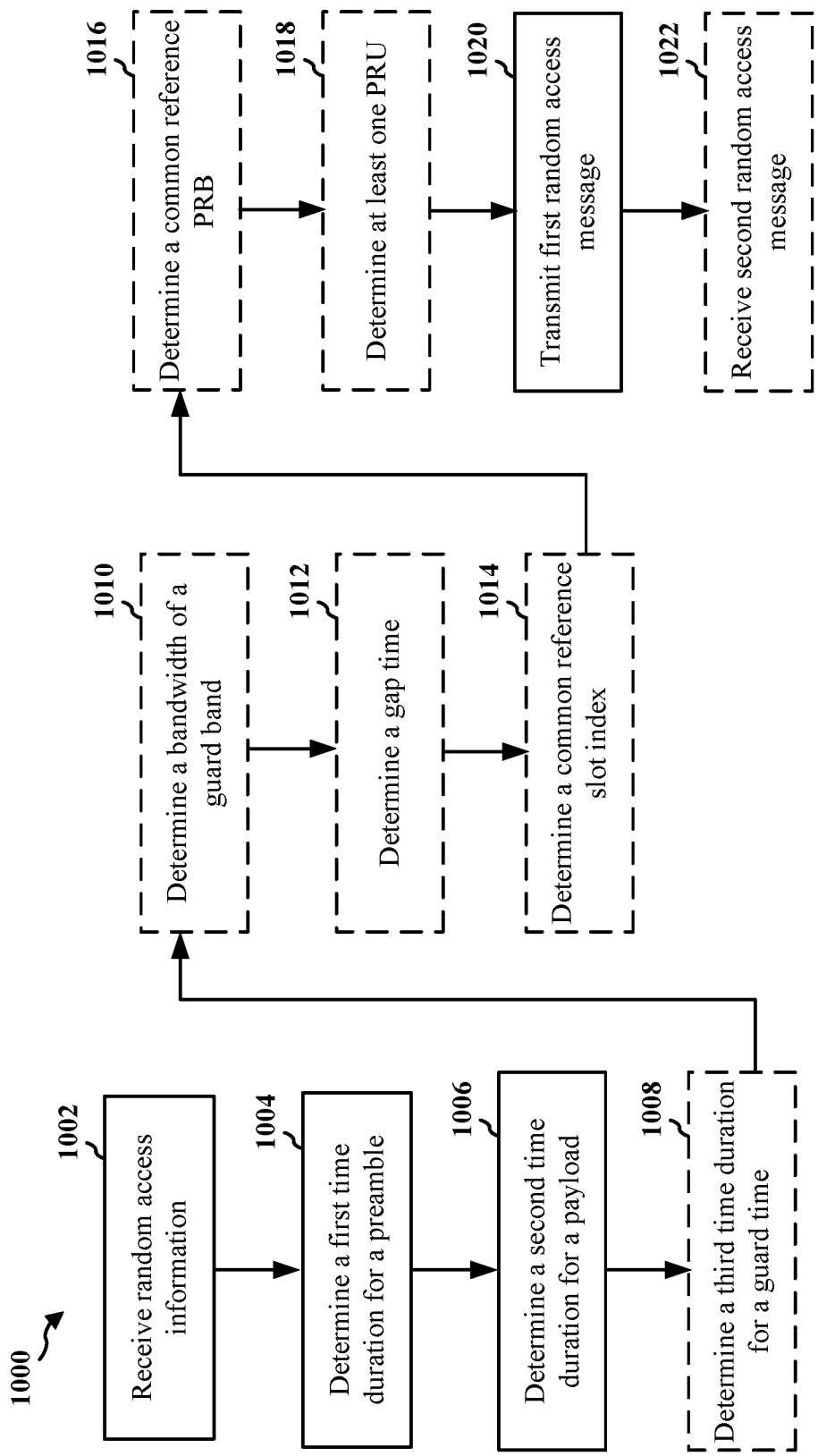
FIG. 10 is a flowchart of a method of wireless communication.

FIG. 10 is a flowchart 1000 of a method of wireless communication. The method may be performed by a UE or a component of a UE (e.g., the UE 104, 350, 902, 1450; the apparatus 1102/1102; the processing system 1214, which may include the memory 360 and which may be the entire UE or a component of the UE, such as the TX processor 368, the RX processor 356, and/or the controller/processor 359). One or more of the illustrated operations may be omitted, transposed, or contemporaneous. In FIG. 10, optional aspects are illustrated with a dashed line. The method may enable a UE to utilize a unified coordinate reference to describe the time-frequency resource configuration for a two-step RACH procedure.

At 1002, the UE may receive random access configuration information (e.g., 906). For example, 1002 may be performed by random access configuration component 1106 of apparatus 1102. The UE may receive, from a base station, the random access configuration information for the base station. The random access configuration information may correspond to 406, 906 and/or 907, as described in connection with FIGS. 4 and 9.

At 1004, the UE may determine a first time duration (e.g., 908) for a preamble (e.g., 404, 926) of a first random access message (e.g., 402, 924). For example, 1004 may be performed by preamble time duration component 1108 of apparatus 1102. The UE may determine the first time duration for the preamble of the first random access message based on the random access configuration information received from the base station on one or multiple carrier frequencies and a reference SCS common to multiple carrier frequencies. The reference SCS may be associated with an uplink bandwidth part (BWP) configured for the first random access message.

At 1006, the UE may determine a second time duration (e.g., 910) for a payload (e.g., 406, 928) of the first random access message. For example, 1006 may be performed by payload time duration component 1110 of apparatus 1102. The UE may determine the second time duration for the payload of the first random access message based on the random access configuration information received from the base station on one or multiple carrier frequencies and the reference SCS. The preamble and the payload may be based on the same numerology or different numerologies. The preamble and payload may be based on the same time-frequency resource allocation or different time-frequency resource allocations. The random access configuration information may indicate information regarding the time and/or frequency allocation or numerology of the payload and the preamble with reference to the reference SCS. The reference SCS may be predefined and known to the UE and the base station. In some aspects, the base station may transmit information about the reference SCS to be used by the UE.

In some aspects, for example, at 1008, the UE may determine a third time duration (e.g., 912) for a guard time (e.g., 410) between the preamble (e.g., 404, 926) and the payload (e.g., 406, 928) of the first random access message. For example, 1008 may be performed by guard time component 1112 of apparatus 1102. The third time duration of the guard time may be determined based on the random access configuration information received from the base station and the reference SCS. In some aspects, at least one of the preamble or the payload may comprise the guard time.

In some aspects, for example, at 1010, the UE may determine a bandwidth (e.g., 914) of a guard band (e.g., 408) and a duration of a guard period (e.g., 410) for the first random access message. For example, 1010 may be performed by guard band component 1114 of apparatus 1102. The UE may determine the bandwidth of the guard band and the duration of the guard period for the first random access message based on the random access configuration information received from the base station and the reference SCS. In some aspects, at least one of the preamble or the payload may be transmitted using the guard band.

In some aspects, for example, at 1012, the UE may determine a gap time duration (e.g., 916) for a transmission gap (e.g., 412) between the preamble and the payload. For example, 1012 may be performed by gap time component 1116 of apparatus 1102. The UE may determine the gap time duration for the transmission gap between the preamble and the payload based on the random access configuration information received from the base station and the reference SCS.

In some aspects, for example, at 1014, the UE may determine a common reference slot index (e.g., 918) for the first random access message. For example, 1014 may be performed by common reference slot index component 1118 of apparatus 1102. The UE may determine the common reference slot index for the first random access message based on the reference SCS for one or multiple carrier frequencies. In some aspects, a time domain mapping of the first random access message on one or multiple carrier frequencies may be based on the common reference slot index.

In some aspects, for example, at 1016, the UE may determine a common reference PRB (e.g., 920) for the first random access message for one or multiple carrier frequencies. For example, 1016 may be performed by common reference PRB component 1120 of apparatus 1102. The UE may determine the common reference PRB for the first random access message based on the reference SCS. In some aspects, the base station may specify a time/frequency offset between a msgA preamble occasion (RO) and a msgA payload occasion (PO) for a different numerology, a different slot format, and/or a different PO size. In some aspects, a frequency domain mapping of the first random access message on one or multiple carrier frequencies may be based on the common reference PRB. In some aspects, the transmission of the first random access message may be based on at least one of the common reference slot index or the common reference PRB.

In some aspects, for example, at 1018, the UE may determine at least one PRU (e.g., 922) for the payload. For example, 1018 may be performed by PRU component 1122 of apparatus 1102. The at least one PRU may be associated with a DMRS antenna port and a DMRS scrambling ID. The DMRS scrambling ID may be based at least on a preamble sequence index of the preamble. In some aspects, the at least one PRU may comprise a code domain index. The code domain index may be based at least on the DMRS antenna port, the DMRS scrambling ID, or the preamble sequence index.

At 1020, the UE may transmit the first message (e.g., 402, 924) to the base station (e.g., 904) on one or multiple carrier frequencies to initiate a random access procedure. For example, 1020 may be performed by transmission component 1124 of apparatus 1102.

In some aspects, for example, at 1022, the UE may receive, from the base station on one or multiple carrier frequencies, a second random access response message in response to the first random access message. For example, 1022 may be performed by reception component 1104 of apparatus 1102. The second random access response message may comprise at least one of a timing advance indication or an uplink grant indication. In some aspects, the time domain mapping of the second random access response message may be based on the common reference slot index. In some aspects, a frequency domain mapping of the second random access response message may be based on the common reference PRB. In some aspects, at least one of the timing advance indication or the uplink grant indication may be based on the reference SCS. In some aspects, at least one of the timing advance indication or the uplink grant indication may be based on an actual SCS used in the transmission of the payload comprised in the first random access message. In some aspects, at least one of the timing advance indication or the uplink grant indication may be based on a network configuration for an initial uplink BWP. In some aspects, at least one of the timing advance indication or the uplink grant indication may be based on an active uplink BWP. The UE may interpret the TA and/or uplink grant indication from the base station based on the reference SCS, a reference PRB index, and/or a reference slot index. The reference SCS may be predefined. In another example, the SCS may be based on the SCS used by the UE in the first random access message payload transmission. The TA and/or uplink grant indication may be based on a network configuration for an initial uplink BWP. The TA and/or uplink grant may be based on an active uplink BWP. In some aspects, a time domain mapping of the second random access response message may be based on the common reference slot index. In some aspects, a frequency domain mapping of the second random access response message may be based on the common reference PRB.

Figure 11:
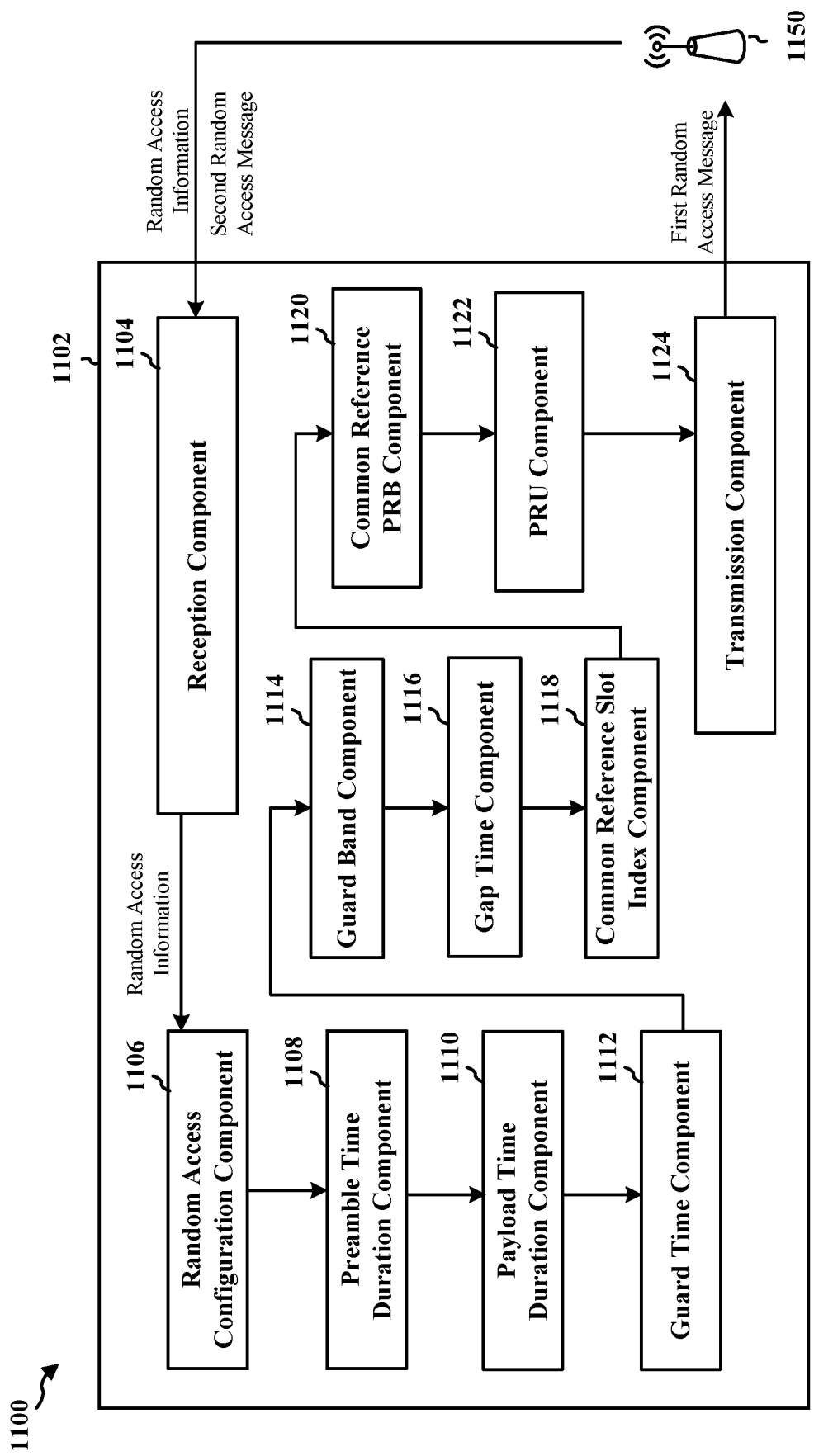
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE or a component of a UE. The apparatus includes a reception component 1104 that may receive a second random access response message (e.g., 938) in response to a first random access message (e.g., 924), e.g., as described in connection with 1022 of FIG. 10. The second random access response message may comprise at least one of a timing advance indication or an uplink grant indication. The apparatus includes a random access configuration component 1106 that may receive, from a base station (e.g., 904), random access configuration information (e.g., 906) for the base station, e.g., as described in connection with 1002 of FIG. 10. The apparatus includes a preamble time duration component 1108 that may determine a first time duration (e.g., 908) for a preamble (e.g., 404, 926) of a first random access message (e.g., 402, 924), e.g., as described in connection with 1004 of FIG. 10. The apparatus includes a payload time duration component 1110 that may determine a second time duration (e.g., 910) for a payload (e.g., 406, 928) of the first random access, e.g., as described in connection with 1006 of FIG. 10. The apparatus includes a guard time component 1112 that may determine a third time duration (e.g., 912) for a guard time (e.g., 410) between the preamble (e.g., 404, 926) and the payload (e.g., 406, 928) of the first random access message, e.g., as described in connection with 1008 of FIG. 10. The third time duration of the guard time may be determined based on the random access configuration information received from the base station and the reference SCS. The apparatus includes a guard band component 1114 that may determine a bandwidth (e.g., 914) of a guard band (e.g., 408) and a duration of a guard period for the first random access message, e.g., as described in connection with 1010 of FIG. 10. The apparatus includes a gap time component 1116 that may determine a gap time duration (e.g., 916) for a transmission gap (e.g., 412) between the preamble and the payload, e.g., as described in connection with 1012 of FIG. 10. The apparatus includes a common reference slot index component 1118 that may determine a common reference slot index (e.g., 918) for the first random access message, e.g., as described in connection with 1014 of FIG. 10. The apparatus includes a common reference PRB component 1120 that may determine a common reference PRB (e.g., 920) for the first random access message, e.g., as described in connection with 1016 of FIG. 10. The apparatus includes a PRU component 1122 that may determine at least one PRU (e.g., 922) for the payload, e.g., as described in connection with 1018 of FIG. 10. The apparatus includes a transmission component 1124 that may transmit the first message (e.g., 402, 924) to the base station (e.g., 904), e.g., as described in connection with 1020 of FIG. 10.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
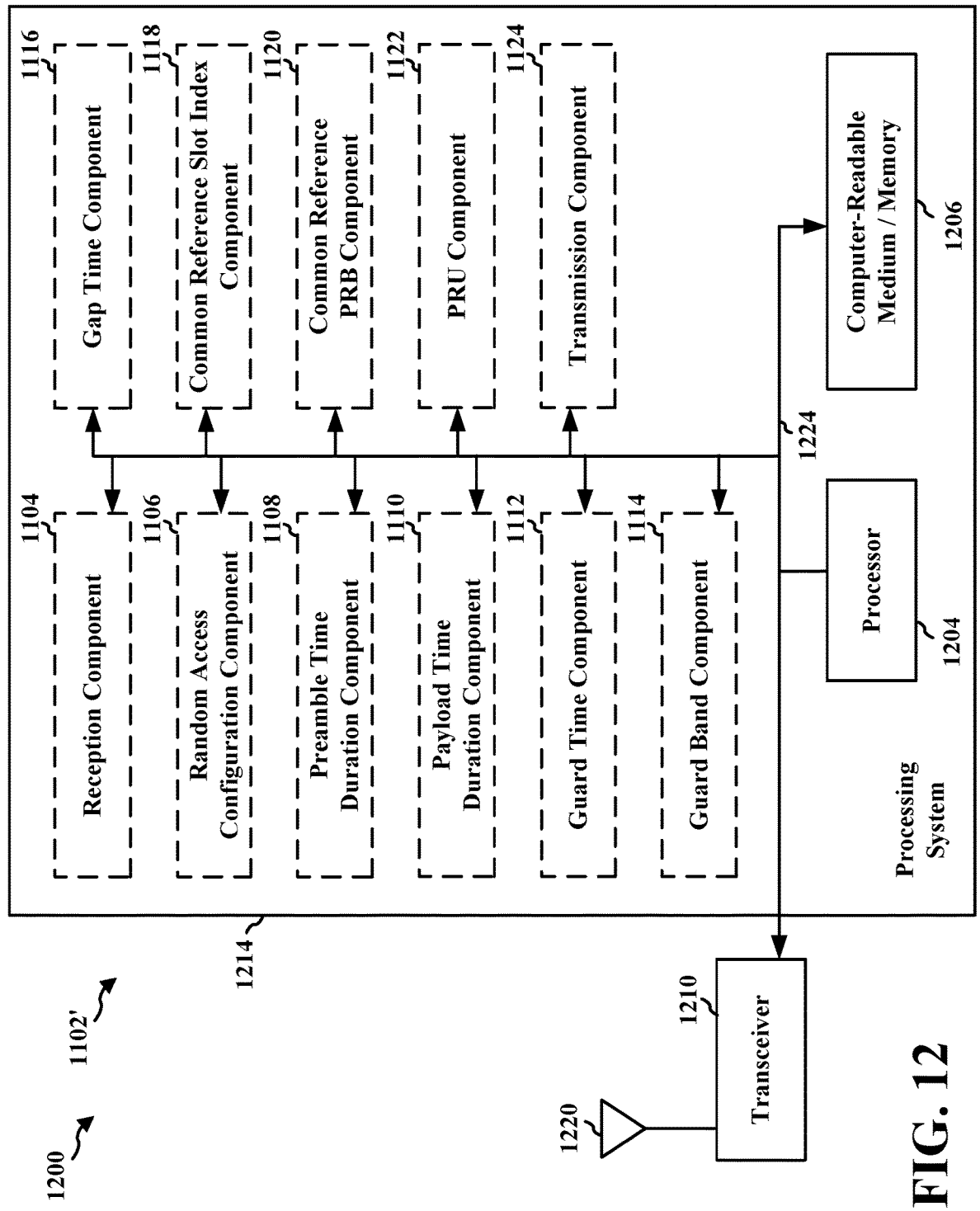
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, 1122, 1124 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1124, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120, 1122, 1124. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for receiving, from a base station, random access configuration information for the base station. The apparatus includes means for determining a first time duration for a preamble of a first random access message based on the random access configuration information received from the base station and a reference SCS associated with an uplink BWP configured for the first random access message. The apparatus includes means for determining a second time duration for a payload of the first random access message based on the random access configuration information received from the base station and the reference SCS. The apparatus includes means for transmitting the first message to the base station to initiate a random access procedure. The apparatus further includes means for determining a third time duration for a guard time between the preamble and the payload of the first random access message. The third time duration of the guard time may be determined based on the random access configuration information received from the base station and the reference SCS. The apparatus further includes means for determining a bandwidth of a guard band and a duration of a guard period for the first random access message based on the random access configuration information received from the base station and the reference SCS. The apparatus further includes means for determining a gap time duration for a transmission gap between the preamble and payload based on the random access configuration information received from the base station and the referenced SCS. The apparatus further includes means for determining a common reference slot index for the first random access message based on the reference SCS for one or multiple carrier frequencies. The apparatus further includes means for determining a common reference PRB for the first random access message for one or multiple carrier frequencies based on the reference SCS. The apparatus further includes means for receiving, from the base station on one or multiple carrier frequencies, a second random access response message in response to the first random access message. A time domain mapping of the second random access response message may be based on the common reference slot index. A frequency domain mapping of the second random access response message may be based on the common reference PRB. The apparatus further includes means for determining at least one PRU. The PRU may be associated with a DMRS antenna port and a DMRS scrambling ID. The DMRS scrambling ID may be based at least on a preamble sequence index of the preamble. The apparatus further includes means for receiving, from the base station, a second random access response message on one or multiple carrier frequencies in response to the first random access message. The second random access response message may comprise at least one of a timing advance indication or an uplink grant indication. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
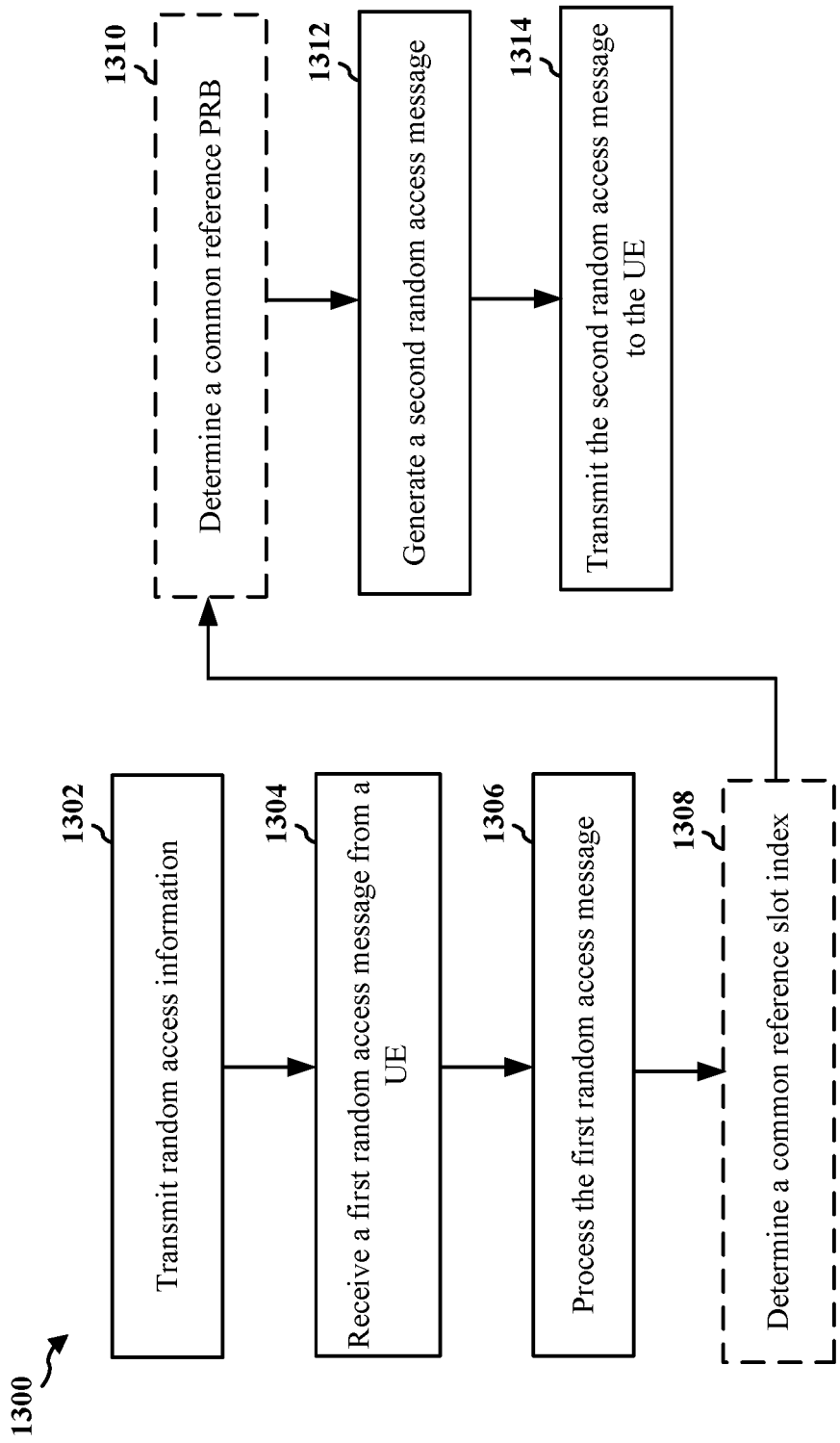
FIG. 13 is a flowchart of a method of wireless communication.

FIG. 13 is a flowchart 1300 of a method of wireless communication. The method may be performed by a base station or a component of a base station (e.g., the base station 102, 180, 310, 904, 1150; the apparatus 1402/1402'; the processing system 1514, which may include the memory 376 and which may be the entire base station or a component of the base station, such as the TX processor 316, the RX processor 370, and/or the controller/processor 375). One or more of the illustrated operations may be omitted, transposed, or contemporaneous. In FIG. 13, optional aspects are illustrated with a dashed line. The method may enable a base station to provide and/or utilize a unified coordinate reference to describe the time-frequency resource configuration for a two-step RACH procedure.

At 1302, the base station may transmit random access configuration information (e.g., 906) for the random access procedure to a UE on one or multiple carrier frequencies. For example, 1302 may be performed by the random access component 1406 of apparatus 1402. The random access configuration information may be based on a reference SCS associated with an uplink BWP configured for the first random access message. The random access configuration information may correspond to 406, 906 and/or 907, as described in connection with FIGS. 4 and 9.

At 1304, the base station may receive a first random access message (e.g., 402, 924) from the UE (e.g., 902) on one or multiple carrier frequencies to initiate a RACH procedure. For example, 1304 may be performed by a reception component 1404 of apparatus 1402. The first random access message may comprise a preamble (e.g., 404, 926) and a payload (e.g., 406, 928). The preamble may include a first time duration based on the reference SCS. The payload may include a second time duration based on the reference SCS.

At 1306, the base station may process the first random access message (e.g., 402, 930). For example, 1306 may be performed by processor component 1408 of apparatus 1402. In some aspects, processing the first random access message may include using a DMRS scrambling ID based at least on a preamble sequence index of the preamble.

In some aspects, for example, at 1308, the base station may determine a common reference slot index (e.g., 932) for the second random access response message. For example, 1308 may be performed by common reference slot index component 1410 of apparatus 1402. The base station may determine the common reference slot index for the second random access response message based on a reference SCS associated with the RACH procedure capability of the UE. In some aspects, a time domain mapping of the second random access response message may be based on the common reference slot index.

In some aspects, for example, at 1310, the base station may determine a common reference PRB (e.g., 934) for the second random access response message. For example, 1310 may be performed by common reference PRB component 1412 of apparatus 1402. The base station may determine the common reference PRB for the second random access response message based on the reference SCS. In some aspects, a frequency domain mapping of the second random access response message may be based on the common reference PRB. In some aspects, the transmission of the second random access response message may be based on at least one of the common reference slot index or the common reference PRB.

At 1312, the base station may generate a second random access response message (e.g., 936) in response to the first random access message (e.g., 402, 924). For example, 1312 may be performed by generation component 1414 of apparatus 1402.

At 1314, the base station may transmit the second random access response message (e.g., 938) to the UE (e.g., 902) on one or multiple carrier frequencies. For example, 1314 may be performed by transmission component 1416 of apparatus 1402. In some aspects, the second random access response message may comprise at least one of a timing advance indication or an uplink grant indication. In some aspects, at least one of the timing advance indication or the uplink grant indication may be based on the reference SCS. In some aspects, at least one of the timing advance indication or the uplink grant indication may be based on an actual SCS used in transmission of the payload comprised in the first random access message. In some aspects, at least one of the timing advance indication or the uplink grant indication may be based on a network configuration for an initial uplink BWP. In some aspects, at least one of the timing advance indication or the uplink grant indication may be based on an active uplink BWP.

Figure 14:
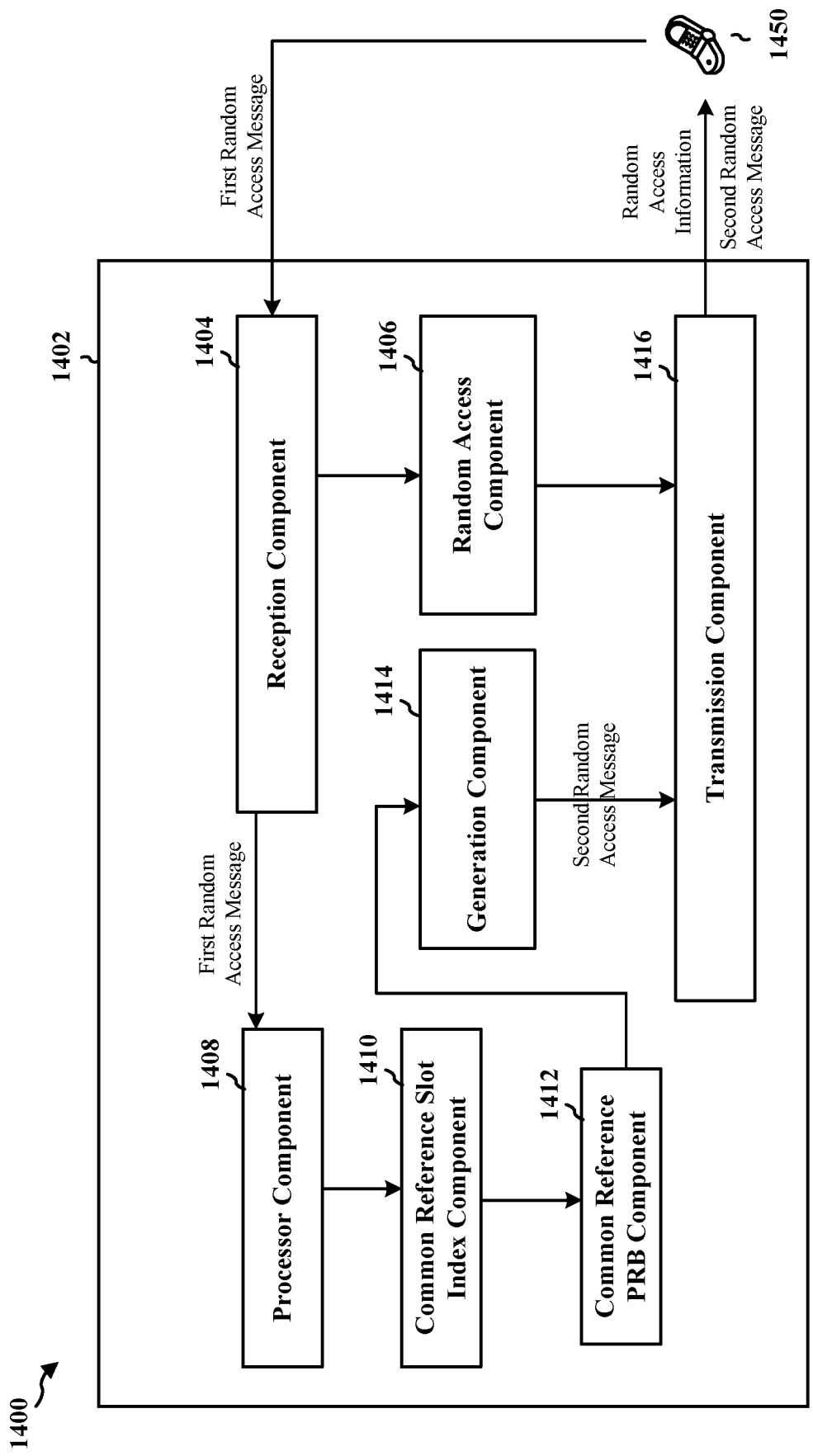
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a base station or a component of a base station. The apparatus includes a reception component 1404 that may receive a first random access message (e.g., 924) from a UE (e.g., 902) to initiate a RACH procedure, e.g., as described in connection with 1304 of FIG. 13. The apparatus includes a random access component 1406 that may transmit random access configuration information for a random access procedure to a UE, e.g., as described in connection with 1302 of FIG. 13. The apparatus includes a processor component 1408 that may process the first random access message (e.g., 930), e.g., as described in connection with 1306 of FIG. 13. The apparatus includes a common reference slot index component 1410 that may determine a common reference slot index (e.g., 932) for the second random access response message, e.g., as described in connection with 1308 of FIG. 13. The apparatus includes a common reference PRB component 1412 that may determine a common reference PRB (e.g., 934) for the second random access response message, e.g., as described in connection with 1310 of FIG. 13. The apparatus includes a generation component 1414 that may generate a second random access response message (e.g., 936) in response to the first random access message (e.g., 924), e.g., as described in connection with 1312 of FIG. 13. The apparatus includes a transmission component 1416 that may transmit the second random access response message (e.g., 938) to the UE (e.g., 902), e.g., as described in connection with 1314 of FIG. 13.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
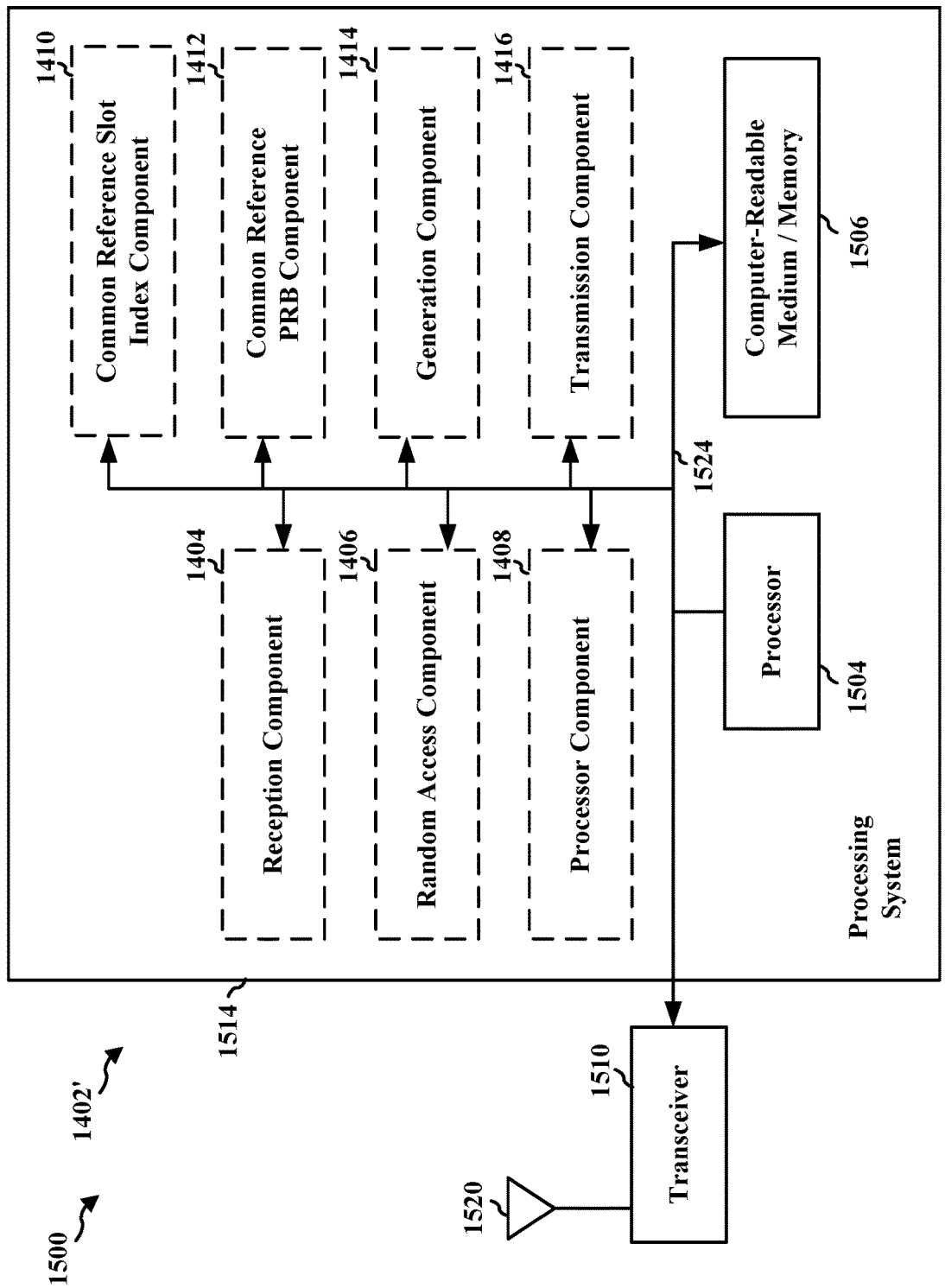
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1416, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, the apparatus 1402/1402' for wireless communication includes means for transmitting random access configuration information for the random access procedure of the UE on one or multiple carrier frequencies. The random access configuration information may be based on a reference SCS. The apparatus includes means for receiving a first random access message from a UE on one or multiple carrier frequencies to initiate a RACH procedure. The first random access message may comprise a preamble and a payload. The preamble may include a first time duration based on the reference SCS. The payload may include a second time duration based on the reference SCS. The apparatus includes means for processing the first random access message. The apparatus includes means for generating a second random access response message in response to the first random access message. The apparatus includes means for transmitting the second random access response message to the UE on one or multiple carrier frequencies. The apparatus may further include means for determining a common reference slot index for the second random access response message based on a reference SCS associated with the RACH procedure capability of the UE. The apparatus may further include means for determining a common reference PRB for the second random access response message based on the reference SCS. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   receiving, from a base station, random access configuration information for the base station;
   determining a first time duration for a preamble of a first random access message based on the random access configuration information received from the base station and a reference subcarrier spacing (SCS) associated with an uplink bandwidth part (BWP) configured for the first random access message;
   determining a second time duration for a payload of the first random access message based on the random access configuration information received from the base station and the reference SCS;
   determining a gap time duration for a transmission gap between the preamble and the payload based on the random access configuration information received from the base station and the reference SCS; and
   transmitting the first random access message to the base station to initiate a random access procedure.

2. The method of claim 1, further comprising:
   determining a third time duration for a guard time between the preamble and the payload of the first random access message, wherein the third time duration of the guard time is determined based on the random access configuration information received from the base station and the reference SCS.

3. The method of claim 2, wherein at least one of the preamble or the payload comprise the guard time.

4. The method of claim 1, further comprising:
   determining a bandwidth of a guard band and a duration of a guard period for the first random access message based on the random access configuration information received from the base station and the reference SCS.

5. The method of claim 4, wherein at least one of the preamble or the payload are transmitted using the guard band.

6. The method of claim 1, further comprising:
   determining a common reference slot index for the first random access message based on the reference SCS associated with an active uplink BWP configured for the first random access message; or
   determining a common reference physical resource block (PRB) for the first random access message based on the reference SCS.

7. The method of claim 6, wherein a time domain mapping of the first random access message is based on the common reference slot index.

8. The method of claim 6, wherein a frequency domain mapping of the first random access message is based on the common reference PRB.

9. The method of claim 6, wherein transmission of the first random access message is based on at least one of the common reference slot index or the common reference PRB.

10. The method of claim 6, further comprising:
    receiving, from the base station, a second random access response message in response to the first random access message, wherein a time domain mapping of the second random access response message is based on the common reference slot index or a frequency domain mapping of the second random access response message is based on the common reference PRB.

11. The method of claim 1, further comprising:
    determining at least one physical uplink shared channel (PUSCH) resource unit for the payload, the PUSCH resource unit (PRU) being associated with a demodulated reference signal (DMRS) antenna port and a DMRS scrambling identifier (ID),
    wherein the DMRS scrambling ID is based at least on a preamble sequence index of the preamble.

12. The method of claim 11, wherein the at least one PRU comprises a code domain index, the code domain index based at least on the DMRS antenna port, the DMRS scrambling ID, or the preamble sequence index.

13. The method of claim 1, further comprising:
    receiving, from the base station, a second random access response message in response to the first random access message, wherein the second random access response message comprises at least one of a timing advance indication or an uplink grant indication.

14. The method of claim 13, wherein the at least one of the timing advance indication or the uplink grant indication is based on the reference SCS.

15. The method of claim 13, wherein the at least one of the timing advance indication or the uplink grant indication is based on an actual SCS used in transmission of the payload comprised in the first random access message.

16. The method of claim 13, wherein the at least one of the timing advance indication or the uplink grant indication is based on a network configuration for an initial uplink BWP.

17. The method of claim 13, wherein the at least one of the timing advance indication or the uplink grant indication is based on an active uplink BWP.

18. An apparatus for wireless communication at a user equipment (UE), comprising:
    means for receiving, from a base station, random access configuration information for the base station;
    means for determining a first time duration for a preamble of a first random access message based on the random access configuration information received from the base station and a reference subcarrier spacing (SCS) associated with an uplink bandwidth part (BWP) configured for the first random access message;

means for determining a second time duration for a payload of the first random access message based on the random access configuration information received from the base station and the reference SCS;

means for determining a gap time duration for a transmission gap between the preamble and the payload based on the random access configuration information received from the base station and the reference SCS; and means for transmitting the first random access message to the base station to initiate a random access procedure.

19. The apparatus of claim 18, further comprising:
means for determining a third time duration for a guard time between the preamble and the payload of the first random access message, wherein the third time duration of the guard time is determined based on the random access configuration information received from the base station and the reference SCS.

20. The apparatus of claim 19, wherein at least one of the preamble or the payload comprise the guard time.

21. The apparatus of claim 18, further comprising:
means for determining a bandwidth of a guard band and a duration of a guard period for the first random access message based on the random access configuration information received from the base station and the reference SCS.

22. The apparatus of claim 21, wherein at least one of the preamble or the payload are transmitted using the guard band.

23. The apparatus of claim 18, further comprising:
means for determining a common reference slot index for the first random access message based on the reference SCS associated with an active uplink BWP configured for the first random access message; or means for determining a common reference physical resource block (PRB) for the first random access message based on the reference SCS.

24. The apparatus of claim 23, wherein a time domain mapping of the first random access message is based on the common reference slot index.

25. The apparatus of claim 23, wherein a frequency domain mapping of the first random access message is based on the common reference PRB.

26. The apparatus of claim 23, wherein transmission of the first random access message is based on at least one of the common reference slot index or the common reference PRB.

27. The apparatus of claim 23, further comprising:
means for receiving, from the base station, a second random access response message in response to the first random access message, wherein a time domain mapping of the second random access response message is based on the common reference slot index or a frequency domain mapping of the second random access response message is based on the common reference PRB.

28. The apparatus of claim 18, further comprising:
means for determining at least one physical uplink shared channel (PUSCH) resource unit for the payload, the PUSCH resource unit (PRU) being associated with a demodulated reference signal (DMRS) antenna port and a DMRS scrambling identifier (ID),
wherein the DMRS scrambling ID is based at least on a preamble sequence index of the preamble.

29. The apparatus of claim 28, wherein the at least one PRU comprises a code domain index, the code domain index based at least on the DMRS antenna port, the DMRS scrambling ID, or the preamble sequence index.

30. The apparatus of claim 18, further comprising:
means for receiving, from the base station, a second random access response message in response to the first random access message, wherein the second random access response message comprises at least one of a timing advance indication or an uplink grant indication.

31. The apparatus of claim 30, wherein the at least one of the timing advance indication or the uplink grant indication is based on the reference SCS.

32. The apparatus of claim 30, wherein the at least one of the timing advance indication or the uplink grant indication is based on an actual SCS used in transmission of the payload comprised in the first random access message.

33. The apparatus of claim 30, wherein the at least one of the timing advance indication or the uplink grant indication is based on a network configuration for an initial uplink BWP.

34. The apparatus of claim 30, wherein the at least one of the timing advance indication or the uplink grant indication is based on an active uplink BWP.

35. An apparatus for wireless communication at a user equipment (UE), comprising:
a memory; and
at least one processor coupled to the memory and configured to:
receive, from a base station, random access configuration information for the base station;
determine a first time duration for a preamble of a first random access message based on the random access configuration information received from the base station and a reference subcarrier spacing (SCS) associated with an uplink bandwidth part (BWP) configured for the first random access message;
determine a second time duration for a payload of the first random access message based on the random access configuration information received from the base station and the reference SCS;
determine a gap time duration for a transmission gap between the preamble and the payload based on the random access configuration information received from the base station and the reference SCS; and
transmit the first random access message to the base station to initiate a random access procedure.

36. The apparatus of claim 35, the at least one processor further configured to:
determine a third time duration for a guard time between the preamble and the payload of the first random access message, wherein the third time duration of the guard time is determined based on the random access configuration information received from the base station and the reference SCS.

37. The apparatus of claim 35, the at least one processor further configured to:
determine a bandwidth of a guard band and a duration of a guard period for the first random access message based on the random access configuration information received from the base station and the reference SCS.

38. The apparatus of claim 35, the at least one processor further configured to:
determine a common reference slot index for the first random access message based on the reference SCS associated with an active uplink BWP configured for the first random access message; or determine a common reference physical resource block (PRB) for the first random access message based on the reference SCS.

39. The apparatus of claim 38, the at least one processor further configured to:
receive, from the base station, a second random access response message in response to the first random access message, wherein a time domain mapping of the second random access response message is based on the common reference slot index or a frequency domain mapping of the second random access response message is based on the common reference PRB.

40. The apparatus of claim 35, the at least one processor further configured to:
determine at least one physical uplink shared channel (PUSCH) resource unit for the payload, the PUSCH resource unit (PRU) being associated with a demodulated reference signal (DMRS) antenna port and a DMRS scrambling identifier (ID),
wherein the DMRS scrambling ID is based at least on a preamble sequence index of the preamble.

41. The apparatus of claim 35, the at least one processor further configured to:
receive, from the base station, a second random access response message in response to the first random access message, wherein the second random access response message comprises at least one of a timing advance indication or an uplink grant indication.

42. A non-transitory computer-readable medium storing computer executable code for wireless communication at a user equipment (UE), the code when executed by a processor cause the processor to:
receive, from a base station, random access configuration information for the base station;
determine a first time duration for a preamble of a first random access message based on the random access configuration information received from the base station and a reference subcarrier spacing (SCS) associated with an uplink bandwidth part (BWP) configured for the first random access message;
determine a second time duration for a payload of the first random access message based on the random access configuration information received from the base station and the reference SCS;
determine a gap time duration for a transmission gap between the preamble and the payload based on the random access configuration information received from the base station and the reference SCS; and
transmit the first random access message to the base station to initiate a random access procedure.

43. A method of wireless communication at a base station, comprising:
transmitting random access configuration information for a random access procedure to a user equipment (UE) based on a reference subcarrier spacing (SCS) associated with an uplink bandwidth part (BWP) configured for a first random access message;
receiving the first random access message from the UE to initiate a random access channel (RACH) procedure, the first random access message comprising a preamble and a payload, wherein a first time duration of the preamble and a second time duration of the payload are based on the reference SCS, wherein a gap time duration for a transmission gap between the preamble and the payload is based on the random access configuration information and the reference SCS;
processing the first random access message;
generating a second random access response message in response to the first random access message; and
transmitting the second random access response message to the UE.

44. The method of claim 43, further comprising:
determining a common reference slot index for the second random access response message based on a reference SCS associated with a RACH procedure capability of the UE; or
determining a common reference physical resource block (PRB) for the second random access response message based on the reference SCS.

45. The method of claim 44, wherein a time domain mapping of the second random access response message is based on the common reference slot index.

46. The method of claim 44, wherein a frequency domain mapping of the second random access response message is based on the common reference PRB.

47. The method of claim 44, wherein transmission of the second random access response message is based on at least one of the common reference slot index or the common reference PRB.

48. The method of claim 43, wherein processing the first random access message comprises using a demodulated reference signal (DMRS) scrambling identifier (ID) based at least on a preamble sequence index of the preamble.

49. The method of claim 43, wherein the second random access response message comprises at least one of a timing advance indication or an uplink grant indication.

50. The method of claim 49, wherein the at least one of the timing advance indication or the uplink grant indication is based on the reference SCS.

51. The method of claim 49, wherein the at least one of the timing advance indication or the uplink grant indication is based on an actual SCS used in transmission of the payload comprised in the first random access message.

52. The method of claim 49, wherein the at least one of the timing advance indication or the uplink grant indication is based on a network configuration for an initial uplink BWP.

53. The method of claim 49, wherein the at least one of the timing advance indication or the uplink grant indication is based on an active uplink BWP.

54. An apparatus for wireless communication at a base station, comprising:
means for transmitting random access configuration information for a random access procedure of a user equipment (UE) based on a reference subcarrier spacing (SCS) associated with an uplink bandwidth part (BWP) configured for a first random access message;
means for receiving the first random access message from the UE to initiate a random access channel (RACH) procedure, the first random access message comprising a preamble and a payload, wherein a first time duration of the preamble and a second time duration of the payload are based on the reference SCS, wherein a gap time duration for a transmission gap between the preamble and the payload is based on the random access configuration information and the reference SCS;
means for processing the first random access message;
means for generating a second random access response message in response to the first random access message; and
means for transmitting the second random access response message to the UE.

55. The apparatus of claim 54, further comprising:
means for determining a common reference slot index for the second random access response message based on a reference SCS associated with a RACH procedure capability of the UE; or
means for determining a common reference physical resource block (PRB) for the second random access response message based on the reference SCS.

56. The apparatus of claim 55, wherein a time domain mapping of the second random access response message is based on the common reference slot index.

57. The apparatus of claim 55, wherein a frequency domain mapping of the second random access response message is based on the common reference PRB.

58. The apparatus of claim 55, wherein transmission of the second random access response message is based on at least one of the common reference slot index or the common reference PRB.

59. The apparatus of claim 54, wherein processing the first random access message comprises using a demodulated reference signal (DMRS) scrambling identifier (ID) based at least on a preamble sequence index of the preamble.

60. The apparatus of claim 54, wherein the second random access response message comprises at least one of a timing advance indication or an uplink grant indication.

61. The apparatus of claim 60, wherein the at least one of the timing advance indication or the uplink grant indication is based on the reference SCS.

62. The apparatus of claim 60, wherein the at least one of the timing advance indication or the uplink grant indication is based on an actual SCS used in transmission of the payload comprised in the first random access message.

63. The apparatus of claim 60, wherein the at least one of the timing advance indication or the uplink grant indication is based on a network configuration for an initial uplink bandwidth part (BWP).

64. The apparatus of claim 60, wherein the at least one of the timing advance indication or the uplink grant indication is based on an active uplink BWP.

65. An apparatus for wireless communication at a base station, comprising:
a memory; and
at least one processor coupled to the memory and configured to:
transmit random access configuration information for a random access procedure of a user equipment (UE) based on a reference subcarrier spacing (SCS) associated with an uplink bandwidth part (BWP) configured for a first random access message;
receive the first random access message from the UE to initiate a random access channel (RACH) procedure, the first random access message comprising a preamble and a payload, wherein a first time duration of the preamble and a second time duration of the payload are based on the reference SCS, wherein a gap time duration for a transmission gap between the preamble and the payload is based on the random access configuration information and the reference SCS;
process the first random access message;
generate a second random access response message in response to the first random access message; and
transmit the second random response access message to the UE.

66. The apparatus of claim 65, the at least one processor further configured to:
determine a common reference slot index for the second random access response message based on a reference SCS associated with a RACH procedure capability of the UE; or
determine a common reference physical resource block (PRB) for the second random access response message based on the reference SCS.

67. A non-transitory computer-readable medium storing computer executable code for wireless communication at a base station, the code when executed by a processor cause the processor to:
transmit random access configuration information for a random access procedure of a user equipment (UE) based on a reference subcarrier spacing (SCS) associated with an uplink bandwidth part (BWP) configured for a first random access message;
receive the first random access message from the UE to initiate a random access channel (RACH) procedure, the first random access message comprising a preamble and a payload, wherein a first time duration of the preamble and a second time duration of the payload are based on the reference SCS, wherein a gap time duration for a transmission gap between the preamble and the payload is based on the random access configuration information and the reference SCS;
process the first random access message;
generate a second random access response message in response to the first random access message; and
transmit the second random access response message to the UE.

* * * * *